United States Patent
Koponen et al.

(10) Patent No.: US 10,069,676 B2
(45) Date of Patent: *Sep. 4, 2018

(54) STORING NETWORK STATE AT A NETWORK CONTROLLER

(71) Applicant: Nicira, Inc., Palo Alto, CA (US)

(72) Inventors: Teemu Koponen, San Francisco, CA (US); Bruce Davie, Menlo Park, CA (US); Jeremy Stribling, San Francisco, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/583,960

(22) Filed: May 1, 2017

(65) Prior Publication Data

US 2017/0237605 A1    Aug. 17, 2017

Related U.S. Application Data

(63) Continuation of application No. 14/320,610, filed on Jun. 30, 2014, now Pat. No. 9,667,447.

(Continued)

(51) Int. Cl.
  *H04L 12/26* (2006.01)
  *H04L 12/24* (2006.01)
  (Continued)

(52) U.S. Cl.
  CPC .......... *H04L 41/0672* (2013.01); *H04L 12/66* (2013.01); *H04L 41/0695* (2013.01);
  (Continued)

(58) Field of Classification Search
  None
  See application file for complete search history.

(56) References Cited

U.S. PATENT DOCUMENTS 5,504,921 A   4/1996   Dev et al.
5,550,816 A   8/1996   Hardwick et al.
(Continued)

FOREIGN PATENT DOCUMENTS

AU    2012328699 A1    4/2014
EP    1443423 A1       8/2004
(Continued)

OTHER PUBLICATIONS

Author Unknown, "Apache Cassandra™ 1.2 Documentation," Jan. 13, 2013, 201 pages, DataStax.

(Continued)

*Primary Examiner* — Bob Phunkulh
(74) *Attorney, Agent, or Firm* — Adeli LLP

(57) ABSTRACT

Some embodiments provide a method for a first network controller located at a first physical domain that manages a logical network spanning several physical domains including the first domain. The method stores a set of context identifiers for assignment to logical entities. The context identifiers are for use in packets sent between managed forwarding elements in order to store logical network information in the packets. While connected to a master controller for the logical network at a second physical domain of the several physical domains, the method forwards state input requiring assignment of context identifiers to the master controller. While connectivity is lost with the master controller, the method assigns context identifiers from the stored set of context identifiers to logical entities.

20 Claims, 25 Drawing Sheets

Related U.S. Application Data

(60) Provisional application No. 61/843,882, filed on Jul. 8, 2013.

(51) Int. Cl.
  *H04L 12/66* (2006.01)
  *H04L 12/715* (2013.01)

(52) U.S. Cl.
  CPC .......... *H04L 41/0816* (2013.01); *H04L 41/12* (2013.01); *H04L 45/04* (2013.01)

(56) References Cited

U.S. PATENT DOCUMENTS

| | | |
|---|---|---|
| 5,729,685 A | 3/1998 | Chatwani et al. |
| 5,751,967 A | 5/1998 | Raab et al. |
| 5,796,936 A | 8/1998 | Watabe et al. |
| 5,805,791 A | 9/1998 | Grossman et al. |
| 6,104,699 A | 8/2000 | Holender et al. |
| 6,219,699 B1 | 4/2001 | McCloghrie et al. |
| 6,512,745 B1 | 1/2003 | Abe et al. |
| 6,539,432 B1 | 3/2003 | Taguchi et al. |
| 6,680,934 B1 | 1/2004 | Cain |
| 6,768,740 B1 | 7/2004 | Perlman et al. |
| 6,785,843 B1 | 8/2004 | Mcrae et al. |
| 6,862,263 B1 | 3/2005 | Simmons |
| 6,941,487 B1 | 9/2005 | Balakrishnan et al. |
| 6,963,585 B1 | 11/2005 | Le Pennec et al. |
| 6,999,454 B1 | 2/2006 | Crump |
| 7,046,630 B2 | 5/2006 | Abe et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,286,490 B2 | 10/2007 | Saleh et al. |
| 7,359,971 B2 | 4/2008 | Jorgensen |
| 7,450,598 B2 | 11/2008 | Chen et al. |
| 7,483,370 B1 | 1/2009 | Dayal et al. |
| 7,606,260 B2 | 10/2009 | Oguchi et al. |
| 7,627,692 B2 | 12/2009 | Pessi |
| 7,649,851 B2 | 1/2010 | Takashige et al. |
| 7,710,874 B2 | 5/2010 | Balakrishnan et al. |
| 7,730,486 B2 | 6/2010 | Herington |
| 7,792,987 B1 | 9/2010 | Vohra et al. |
| 7,818,452 B2 | 10/2010 | Matthews et al. |
| 7,826,482 B1 | 11/2010 | Minei et al. |
| 7,885,276 B1 | 2/2011 | Lin |
| 7,937,438 B1 | 5/2011 | Miller et al. |
| 7,948,986 B1 | 5/2011 | Ghosh et al. |
| 8,027,354 B1 | 9/2011 | Portolani et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,779 B2 | 11/2011 | Beardsley et al. |
| 8,166,201 B2 | 4/2012 | Richardson et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,312,129 B1 | 11/2012 | Miller et al. |
| 8,422,359 B2 | 4/2013 | Nakajima |
| 8,456,984 B2 | 6/2013 | Ranganathan et al. |
| 8,504,718 B2 | 8/2013 | Wang et al. |
| 8,621,058 B2 | 12/2013 | Eswaran et al. |
| 8,644,188 B1 | 2/2014 | Brandwine et al. |
| 9,178,833 B2 | 11/2015 | Koponen et al. |
| 9,559,870 B2 | 1/2017 | Koponen et al. |
| 9,571,304 B2 | 2/2017 | Koponen et al. |
| 9,602,312 B2 | 3/2017 | Koponen et al. |
| 2003/0093481 A1 | 5/2003 | Mitchell et al. |
| 2003/0167333 A1 | 9/2003 | Kumar et al. |
| 2003/0188114 A1 | 10/2003 | Lubbers et al. |
| 2003/0188218 A1 | 10/2003 | Lubbers et al. |
| 2004/0044773 A1 | 3/2004 | Bayus et al. |
| 2004/0047286 A1 | 3/2004 | Larsen et al. |
| 2004/0073659 A1 | 4/2004 | Rajsic et al. |
| 2004/0098505 A1 | 5/2004 | Clemmensen |
| 2004/0267897 A1 | 12/2004 | Hill et al. |
| 2005/0018669 A1 | 1/2005 | Arndt et al. |
| 2005/0038834 A1 | 2/2005 | Souder et al. |
| 2005/0083953 A1 | 4/2005 | May |
| 2005/0120160 A1 | 6/2005 | Plouffe et al. |
| 2005/0228952 A1 | 10/2005 | Mayhew et al. |
| 2006/0002370 A1 | 1/2006 | Rabie et al. |
| 2006/0018253 A1 | 1/2006 | Windisch et al. |
| 2006/0026225 A1 | 2/2006 | Canali et al. |
| 2006/0092940 A1 | 5/2006 | Ansari et al. |
| 2006/0092976 A1 | 5/2006 | Lakshman et al. |
| 2006/0174087 A1 | 8/2006 | Hashimoto et al. |
| 2006/0184937 A1 | 8/2006 | Abels et al. |
| 2006/0193266 A1 | 8/2006 | Siddha et al. |
| 2006/0221720 A1* | 10/2006 | Reuter .................. G06F 3/0605 365/189.05 |
| 2007/0043860 A1 | 2/2007 | Pabari |
| 2007/0156919 A1 | 7/2007 | Potti et al. |
| 2007/0220358 A1 | 9/2007 | Goodill et al. |
| 2007/0260721 A1 | 11/2007 | Bose et al. |
| 2007/0297428 A1 | 12/2007 | Bose et al. |
| 2008/0002579 A1 | 1/2008 | Lindholm et al. |
| 2008/0034249 A1 | 2/2008 | Husain et al. |
| 2008/0040467 A1 | 2/2008 | Mendiratta et al. |
| 2008/0049621 A1 | 2/2008 | McGuire et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0159301 A1 | 7/2008 | De Heer |
| 2008/0165704 A1 | 7/2008 | Marchetti et al. |
| 2008/0301379 A1* | 12/2008 | Pong .................. G06F 12/0284 711/148 |
| 2009/0070337 A1 | 3/2009 | Romem et al. |
| 2009/0193297 A1 | 7/2009 | Williams et al. |
| 2009/0241192 A1 | 9/2009 | Thomas |
| 2009/0276661 A1 | 11/2009 | Deguchi et al. |
| 2009/0279549 A1 | 11/2009 | Ramanathan et al. |
| 2010/0002722 A1 | 1/2010 | Porat et al. |
| 2010/0058106 A1 | 3/2010 | Srinivasan et al. |
| 2010/0162036 A1 | 6/2010 | Linden et al. |
| 2010/0205479 A1 | 8/2010 | Akutsu et al. |
| 2010/0257263 A1 | 10/2010 | Casado et al. |
| 2010/0322255 A1 | 12/2010 | Hao et al. |
| 2011/0103259 A1 | 5/2011 | Aybay et al. |
| 2011/0134931 A1 | 6/2011 | Merwe et al. |
| 2011/0231602 A1 | 9/2011 | Woods et al. |
| 2011/0317559 A1 | 12/2011 | Kern et al. |
| 2011/0320821 A1 | 12/2011 | Alkhatib et al. |
| 2012/0120964 A1 | 5/2012 | Koponen et al. |
| 2012/0147898 A1 | 6/2012 | Koponen et al. |
| 2012/0151550 A1 | 6/2012 | Zhang |
| 2012/0158942 A1 | 6/2012 | Kalusivalingam et al. |
| 2012/0185553 A1 | 7/2012 | Nelson |
| 2012/0275328 A1 | 11/2012 | Iwata et al. |
| 2013/0042242 A1 | 2/2013 | Kagan |
| 2013/0044636 A1 | 2/2013 | Koponen et al. |
| 2013/0044641 A1 | 2/2013 | Koponen et al. |
| 2013/0044751 A1 | 2/2013 | Casado et al. |
| 2013/0044752 A1 | 2/2013 | Koponen et al. |
| 2013/0044761 A1 | 2/2013 | Koponen et al. |
| 2013/0044762 A1 | 2/2013 | Casado et al. |
| 2013/0044763 A1 | 2/2013 | Koponen et al. |
| 2013/0044764 A1 | 2/2013 | Casado et al. |
| 2013/0054761 A1 | 2/2013 | Kempf et al. |
| 2013/0058354 A1 | 3/2013 | Casado et al. |
| 2013/0074065 A1* | 3/2013 | McNeeney .......... G06F 11/141 718/1 |
| 2013/0142203 A1 | 6/2013 | Koponen et al. |
| 2013/0211549 A1 | 8/2013 | Thakkar et al. |
| 2013/0212212 A1 | 8/2013 | Addepalli et al. |
| 2013/0212243 A1 | 8/2013 | Thakkar et al. |
| 2013/0212244 A1 | 8/2013 | Koponen et al. |
| 2013/0212245 A1 | 8/2013 | Koponen et al. |
| 2013/0212246 A1 | 8/2013 | Koponen et al. |
| 2013/0219037 A1 | 8/2013 | Thakkar et al. |
| 2013/0301425 A1 | 11/2013 | Udutha et al. |
| 2013/0308641 A1 | 11/2013 | Ackley |
| 2013/0332602 A1 | 12/2013 | Nakil et al. |
| 2013/0332619 A1 | 12/2013 | Xie et al. |

(56) References Cited

U.S. PATENT DOCUMENTS

| | | | |
|---|---|---|---|
| 2014/0064104 | A1 | 3/2014 | Nataraja et al. |
| 2014/0247753 | A1 | 9/2014 | Koponen et al. |
| 2014/0250220 | A1 | 9/2014 | Kapadia et al. |
| 2014/0348161 | A1 | 11/2014 | Koponen et al. |
| 2014/0351432 | A1 | 11/2014 | Koponen et al. |
| 2015/0010012 | A1 | 1/2015 | Koponen et al. |
| 2015/0229641 | A1 | 8/2015 | Sun et al. |

FOREIGN PATENT DOCUMENTS

| | | |
|---|---|---|
| EP | 2748990 A1 | 7/2014 |
| GB | 2485866 A | 5/2012 |
| WO | 2013063332 A1 | 5/2013 |
| WO | 2013158917 A2 | 10/2013 |
| WO | 2013158918 A1 | 10/2013 |
| WO | 2013158920 A1 | 10/2013 |
| WO | 2013184846 A1 | 12/2013 |
| WO | 2015006243 A2 | 1/2015 |

OTHER PUBLICATIONS

Author Unknown, "OpenFlow Switch Specification," Feb. 28, 2011, pp. 1-56.

Author Unknown, "Private Network-Network Interface Specification Version 1.1 (PNNI 1.1)," The ATM Forum Technical Committee, Apr. 2002, 536 pages, The ATM Forum.

Author Unknown, "Virtual Machine Backup Guide," Nov. 2007, pp. 1-78, VMware, Inc., Palo Alto, California.

Belaramani, Nalini, et al., "PRACTI Replication," Proc. of NSDI, May 2006, 14 pages.

Casado, Martin, et al., "SANE: A Protection Architecture for Enterprise Networks," Proceedings of the 15th USENIX Security Symposium, Jul. 31, 2006, pp. 137-151.

Ciavaglia, Laurent, et al., "An Architectural Reference Model for Autonomic Networking, Cognitive Networking and Self-management," Draft ETSI GS AFI 002 V0.0.17, Mar. 2012, 179 pages, http://wvyvv.etsl.org.

Fernandes, Natalia C., et al., "Virtual Networks: isolation, performance, and trends," Annals of Telecommunications, Oct. 7, 2010, pp. 339-355, vol. 66, Institut Telecom and Springer-Verlag, Paris.

Hanna, Jeremy, "How ZooKeeper Handles Failure Scenarios," http://.apache.org/hadoop/Zookeeper/FailureScenarios. Dec. 9, 2010, 1 page.

Heller, Brandon, et al., "The Controller Placement Problem," Hot Topics in Software Defined Networks, Aug. 13, 2012, 6 pages, Helsinki, Finland.

Koponen, Teemu, et al., "Onix: a Distributed Control Platform for Large-scale Production Networks," in Proc. OSDI, Oct. 2010, pp. 1-14.

Krishnaswamy, Umesfi, et al., "ONUS Open Network Operating System—An Experimental Open-Source Distributed SDN OS," Apr. 16, 2013, 4 pages.

Lebresne, Sylvain, "[RELEASE] Apache Cassandra 1.2 released," Jan. 2, 2013, 1 page.

Pankaj, Berde, et al., "ONOS Open Network Operating System an Open-Source Distributed SDN OS," Dec. 19, 2013, 34 pages.

Schneider, Fred B., "Implementing Fault-Tolerant Services Using the State Machine Approach: A Tutorial," ACM Computing Surveys, Dec. 1990, 21 pages, vol. 22, No. 4, ACM.

Stribling, Jeremy, et al., "Flexible, Wide-Area Storage for Distributed Systems with WheeIFS," NSDI '09: 6th USENIX Symposium on Networked Systems Design and Implementation, Apr. 2009, pp. 43-58, USENIX Association.

Terry, Douglas B., "Managing Update Conflicts in Bayou, a Weakly Connected Replicated Storage System," SIGOPS '95, Dec. 1995, pp. 172-183, ACM, Colorado, USA.

PCT International Search Report and Written Opinion dated Jan. 12, 2015 for commonly owned International Patent Application PCT/US2014/045622, 24 pages, Nicira, Inc.

* cited by examiner

STORING NETWORK STATE AT A NETWORK CONTROLLER

CLAIM OF BENEFIT TO PRIOR APPLICATION

This application is a continuation of U.S. patent application Ser. No. 14/320,610, filed Jun. 30, 2014, now published as U.S. Patent Publication 2015/0010012. U.S. patent application Ser. No. 14/320,610 claims the benefit of U.S. Provisional Application 61/843,882, filed Jul. 8, 2013. U.S. Provisional Application 61/843,882 and U.S. patent application Ser. No. 14/320,610, now published as U.S. Patent Publication 2015/0010012, are incorporated herein by reference.

BACKGROUND

A high-level challenge in networking is the establishment of a global service model abstraction and allowing the service model to operate and be reconfigured while the underlying physical network infrastructure is partitioned (i.e., while portions of the network are disconnected from the rest of the network). Possibly, no majority of failure domains will be available.

In general, routing protocols are able to sustain partitioning. For example, Border Gateway Protocol (BGP) can sustain partitioning even in the presence of independently configured policies. Therefore, in such cases network partitioning becomes a non-issue and the routing state can be expected to converge towards a consistent state.

However, in the case of software-defined networking (SDN), the state model is richer and the control plane is not coupled over the physical topology. As such, handling the partitioning of the underlying physical network becomes more difficult.

BRIEF SUMMARY

Some embodiments provide novel techniques for managing a logical network that is implemented across multiple failure domains (i.e., portions of a physical network which could become disconnected from each other). Specifically, some embodiments use network controllers located at each of the multiple domains that store network state in a database that differentiates between local state information and global state information.

The network controllers of some embodiments manage forwarding elements at their local domain by receiving, computing, and storing state information regarding the logical network, and by distributing state information (e.g., in the form of flow entries) to the managed forwarding elements (MFEs) in order for the MFEs to implement the logical network. The state information provided to the MFEs directs the MFEs in terms of how to process packets sent to and from machines (e.g., virtual machines) that are part of the logical network.

In some embodiments, each network controller stores three types of state in its configuration database, each of which are treated differently if the network controller is cut off from the controllers at other domains at which the logical network is present. Some embodiments stores local state information, global state information that is reconcilable with conflicting state information from network controllers at other domains upon reconnection of the domains, and global state information that is not reconcilable with conflicting state information from network controllers at other domains upon reconnection.

The local state is information about the network that only affects the MFEs located at the local domain managed by the network controller. This could include, for example, physical network statistics, information relating to the connection between the network controllers in the domain and the MFEs in the domain, etc. In some embodiments, the local state is always readable and writeable, even at times of disconnection.

The global state, on the other hand, is not always writeable in some embodiments. Global state is network state information that does not affect only the domain of the network controller that stores the state. For instance, security policies (whether port-specific or globally-applied), logical port-to-physical location binding information, assignment of logical context identifiers, etc. Some embodiments divide the global state into two types: reconcilable and non-reconcilable.

Reconcilable global state is that which can be reconciled between controllers at different domains after reconnection if the data conflicts. Non-reconcilable global state, on the other hand, cannot be adequately reconciled between the domains. As such, in some embodiments the non-reconcilable global state becomes read-only (i.e., cannot be changed) at the network controllers during disconnection. Examples of such global non-reconcilable state, in some embodiments, may include globally-applied security policies or the assignment of context identifiers.

In some embodiments, on the other hand, the network controller stores updates to reconcilable global state in a local queue during times of disconnection, and then the network controller (or controllers) at a particular domain performs reconciliation upon reconnection. Some embodiments elect a master controller (or controller cluster) at a particular domain to handle the reconciliation of such global state.

Some embodiments may use different rules for different types of reconcilable global state. For example, some embodiments reconcile mappings of a logical port to a physical location on a time-ordered basis, on the assumption that the most recently seen mapping will be the correct one. On the other hand, security policies may not be time based, and some embodiments always reconcile such policies in favor of the stricter policy (e.g., favoring policies that drop packets rather than allow transmission of packets).

In some embodiments, the controllers at one domain may become disconnected from the controllers at a second domain, while the actual packet transmission between machines at the two domains is not affected (i.e., because the controllers communicate over a separate or partially separate physical network than does the data plane). Due to the possibility of important security policies not being transmitted between domains, some embodiments do not allow reception of packets from other domains, while still allowing the portions of the physical network present within the local domain to continue communication with each other.

Upon reconnection, to ensure that the most updated state is provided to the MFEs at each of the different domains, some embodiments provide transactional updates to the different failure domains. Specifically, in some embodiments, the master controller (or controller cluster) initially performs reconciliation of any global state conflicts between domains. The master controller then sends state updates enabling MFEs to receive packets with the new state to (i) the MFEs in its local domain and (ii) the controllers at the other domains, which in turn distribute the updates to their local MFEs. Next, the master controller sends out the updates for enabling the MFEs to send packets with the new state to both its MFEs and the controllers at the other domains, which again distribute the updates in turn to their local MFEs. Once the MFEs have received the new state information for sending traffic, they begin sending packets using the newly updated state (identified, e.g., by a version number appended to the packets), and the information to receive these packets is already in place.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Some embodiments provide novel techniques for managing a logical network that is implemented across multiple failure domains (i.e., portions of a physical network which could become disconnected from each other). Specifically, some embodiments use network controllers located at each of the multiple domains that store network state in a database that differentiates between local state information and global state information.

The network controllers of some embodiments manage forwarding elements at their local domain by receiving, computing, and storing state information regarding the logical network, and by distributing state information (e.g., in the form of flow entries) to the managed forwarding elements (MFEs) in order for the MFEs to implement the logical network. The state information provided to the MFEs directs the MFEs in terms of how to process packets sent to and from machines (e.g., virtual machines) that are part of the logical network.

Figure 1:
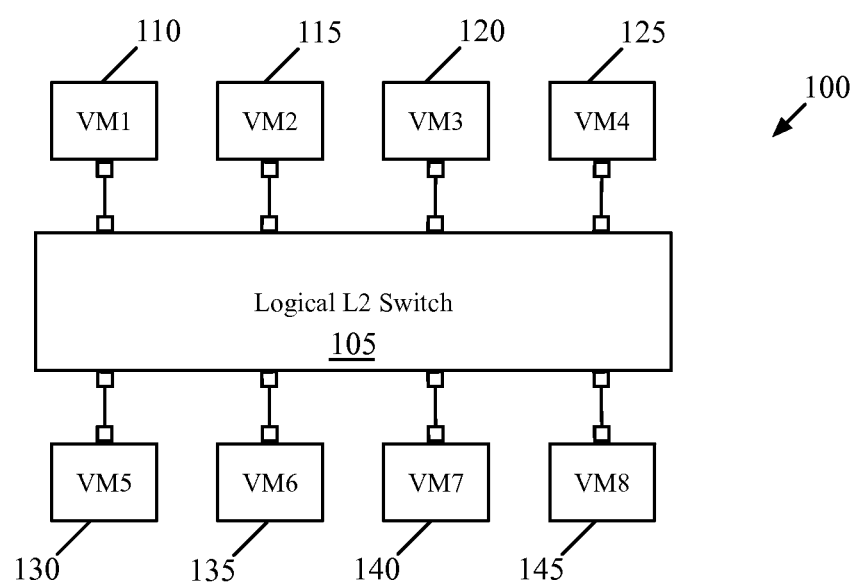
FIG. 1 conceptually illustrates an example of a logical network which can be implemented across multiple failure domains.

FIG. 1 conceptually illustrates an example of such a logical network 100 which can be implemented across multiple failure domains. The example logical network 100 includes only a single logical switch 105 that is implemented across several failure domains. However, one of ordinary skill in the art will recognize that the principles described herein are applicable to logical networks of all varying degrees of complexity, which may include various different types of logical forwarding elements (logical routers, logical switches, etc.) and other logical network constructs. As shown, the logical switch 105 includes eight virtual machines (VMs) 110-145 that connect to the logical switch. In some embodiments, a user (e.g., a network administrator) provides a network controller with state information describing the logical switch 105 (e.g., the coupling of VMs to the logical switch, global policies, policies for the logical ports, etc.).

In some embodiments, the logical network is an abstract conception of a network generated by the administrator, which is implemented in a virtualized, distributed manner in a managed physical infrastructure (e.g., in one or more multi-tenant datacenters, enterprise datacenters, etc.). That is, the VMs that connect to the logical switch may reside on different host machines within the infrastructure (including on host machines in several different datacenters), and physical managed forwarding elements (e.g., software virtual switches) operating on these host machines implement some or all of the logical forwarding elements.

Figure 2:
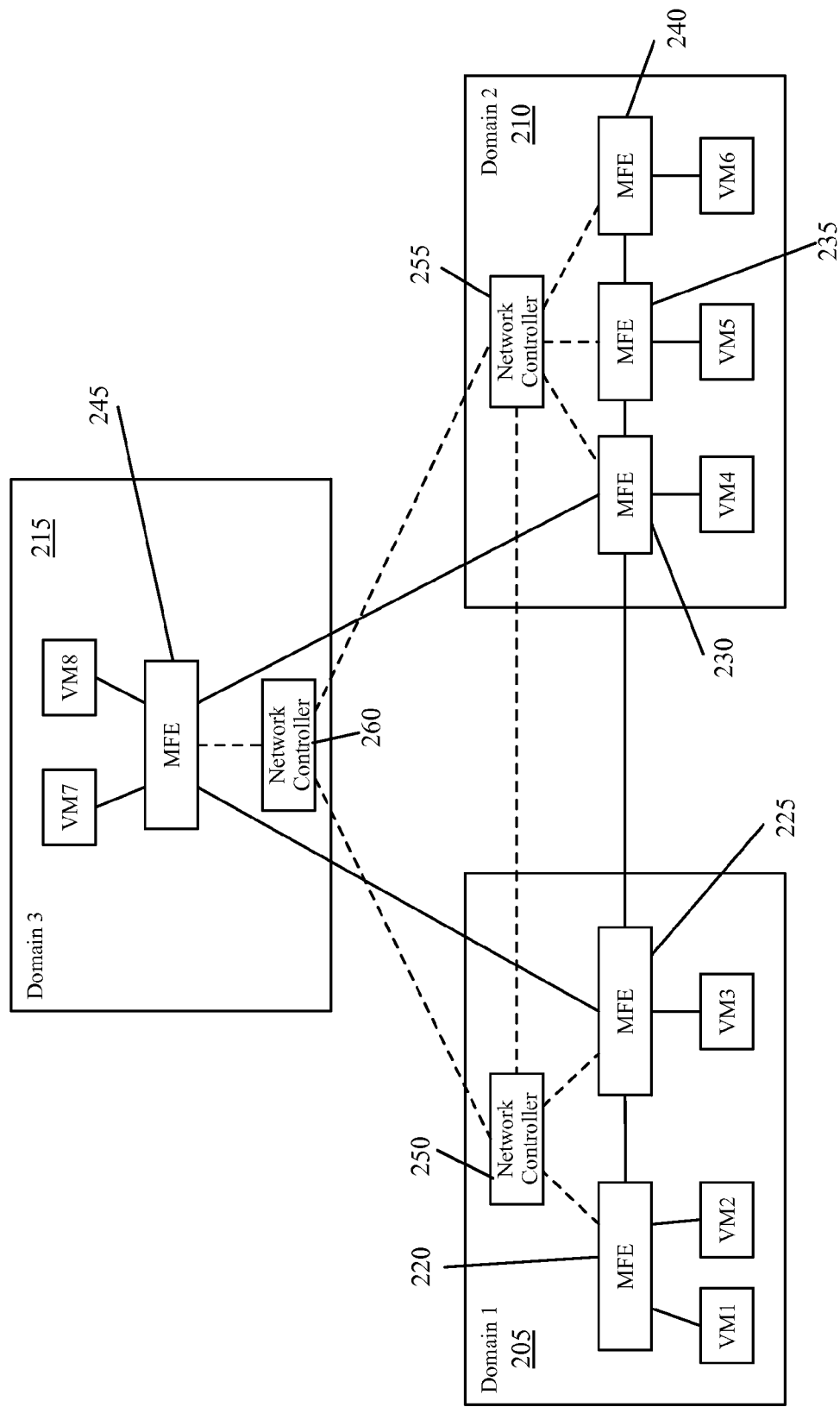
FIG. 2 conceptually illustrates a physical implementation of the logical network of FIG. 1, which is spread across three failure domains.

FIG. 2 conceptually illustrates a physical implementation of the logical network 100, which is spread across three failure domains 205-215. In this figure, solid lines between entities represent data plane communications (i.e., data traffic between VMs) while dashed lines between entities represent control communications (e.g., exchange of network state either between network controllers or between a network controller and a MFE).

As shown, the VMs 110-145 of the logical network 100 are spread across three failure domains 205-215. The failure domains may each be different datacenters, or separate sections within a single datacenter (e.g., separate racks or transport zones, areas with separate power supplies, etc.). Two of the failure domains could be within the same datacenter while the third domain is located in a different datacenter. For instance, a company might wish to have a logical network partially located in its own enterprise datacenter and partially located in one or more public datacenters.

Each of the VMs connects to one of the MFEs 220-245. In some embodiments, the MFEs are software forwarding elements that operate on the same host as the VM that couples to them (e.g., in the virtualization software of the host). For example, in some embodiments the MFEs are Open vSwitch (OVS) or ESX Virtual Switch. The MFEs implement the logical switch 105. While not shown, in some embodiments additional VMs of other logical networks operate on the host machines alongside the illustrated VMs 110-145, and the MFEs therefore implement additional logical networks as well as the logical network 100, while maintaining isolation between the different logical networks.

As shown, the MFEs 225, 230, and 245 connect to each other across the different domains. In some embodiments, these MFEs connect through an intervening network (e.g., the Internet, if at different geographically disparate datacenters). In addition, some embodiments do not have the edge MFEs (the MFEs to which the VMs directly couple) communicate directly with each other, but instead use gateways to process traffic entering or leaving a domain. That is, some embodiments place gateways at the edges of each of (or some of) the domains 205-215 that communicate with each other to send traffic between the domains. For example, a packet sent from the VM 120 to the VM 125 might be sent to the MFE 225, which would send the packet to a first gateway, which sends the packet to a second gateway in the domain 210, which forwards the packet to the MFE 230 and then to the destination VM.

In addition to the MFEs and VMs (which account for the data traffic), the domains 205-215 each include network controllers 250-260. The network controllers 250-260 of some embodiments are responsible for managing the MFEs 220-245 in order for the MFEs to implement logical networks, including the logical network 100. That is, in some embodiments, the network controllers provide the network state information to the MFEs that instructs the MFEs as to how to forward logical network packets.

While the network controllers 250-260 are shown as a single controller in each of the domains 205-215, in some embodiments these illustrated network controllers are actually controller clusters. For instance, in some embodiments each of the domains includes one active controller and one or more standby controllers (e.g., in a master-slave configuration). In addition, in some embodiments, each domain includes a hierarchical network control system with several types of controllers, as described in U.S. Patent Publication 2013/0103817, which is incorporated herein by reference. In some embodiments, the hierarchical network control system includes chassis controllers that operate on the host machines (either as part of the MFE or separate from the MFE). However, for the purposes of this disclosure, the network controllers at each domain will be represented by a single entity, which is understood to represent one or more controllers.

In some embodiments, the network controllers 250-260 are responsible for processing network state data. The network controllers receive input network state data (e.g., from other controllers, from the MFEs, or from administrator input) and store this state information. In addition, the controllers of some embodiments compute output state based on the input state, and both store the output state as well as distribute it to the MFEs. In some embodiments, the network controllers 250-260 perform table mapping operations to map input tables to output tables in order to compute the output state. For instance, in some embodiments the network controllers use the nLog rules engine described in U.S. Patent Publication 2013/0058228, which is incorporated herein by reference. In some embodiments, the state computed by the network controllers includes flow entries that are sent to the MFEs in order to direct the forwarding and other packet processing actions of the MFEs. Other embodiments, however, may have network controllers that compute state in a different manner, or act as repositories and distributors of state information without actually computing any output state.

In some cases, the network controllers 250-260 at the three separate domains over which the logical network 100 is implemented could become disconnected from each other (i.e., one of the network controllers could be unable to reach the other two). For instance, the interface on the network controller could go down, the network between two controllers could go down, etc. In this situation, the network controller that becomes disconnected would be unable to receive state updates from the other controllers or distribute its own state updates to the other controllers.

Some embodiments approach this federation (i.e., partitioning a logical network into multiple failure domains) using a hierarchical controller instance architecture. Examples of such logical network federation are described in detail in U.S. Patent Publication 2013/0044761, which is incorporated herein by reference. Some embodiments, however, provide a technique for performing federation without a hierarchical controller architecture. Instead, the controller clusters of some embodiments span over multiple failure domains (e.g., across multiple datacenters), using a database design for the controllers that enables this partitioning.

The following considers the various types of state in a network virtualization solution of some embodiments as well as how to maintain the consistency of this state in a solution that operates across network partitions (e.g., when one of the partitions becomes disconnected). Furthermore, this considers a particular network design of some embodiments based on these ideas.

In some embodiments, each network controller 250-260 stores three types of state in its configuration database, each of which are treated differently if the network controller is cut off from the controllers at other domains at which the logical network is present. Some embodiments stores local state information, global state information that is reconcilable with conflicting state information from network controllers at other domains upon reconnection of the domains, and global state information that is not reconcilable with conflicting state information from network controllers at other domains upon reconnection.

The local state is information about the network that only affects the MFEs located at the local domain managed by the network controller. This could include, for example, physical network statistics received from the MFEs, information relating to the connection between the local network controller and the local MFEs, etc. In some embodiments, the local state is always readable and writeable, even at times of disconnection.

The global state, on the other hand, is not always writeable in some embodiments. Global state is network state information that does not affect only the domain of the network controller that stores the state. For instance, security policies (whether port-specific or globally-applied), logical port-to-physical location binding information, assignment of logical context identifiers, etc. Some embodiments divide the global state into two types: reconcilable and non-reconcilable.

Reconcilable global state is that which can be reconciled between controllers at different domains after reconnection if the data conflicts. Non-reconcilable global state, on the other hand, cannot be adequately reconciled between the domains. As such, in some embodiments the non-reconcilable global state becomes read-only (i.e., cannot be changed) at the network controllers during disconnection. Examples of such global non-reconcilable state, in some embodiments, may include globally-applied security policies or the assignment of context identifiers.

In some embodiments, on the other hand, the network controller stores updates to reconcilable global state in a local queue during times of disconnection, and then the network controller (or controllers) at a particular domain performs reconciliation upon reconnection. Some embodiments elect a master controller (or controller cluster) at a particular domain to handle the reconciliation of such global state.

Some embodiments may use different rules for different types of reconcilable global state. For example, some embodiments reconcile mappings of a logical port to a physical location on a time-ordered basis, on the assumption that the most recently seen mapping will be the correct one. On the other hand, security policies may not be time based, and some embodiments always reconcile such policies in favor of the stricter policy (e.g., favoring policies that drop packets rather than allow transmission of packets).

In some embodiments, the controllers at one domain may become disconnected from the controllers at a second domain, while the actual packet transmission between machines at the two domains is not affected (i.e., because the controllers communicate over a separate or partially separate physical network than does the data plane). Due to the possibility of important security policies not being transmitted between domains, some embodiments do not allow reception of packets from other domains, while still allowing the portions of the physical network present within the local domain to continue communication with each other.

Upon reconnection, to ensure that the most updated state is provided to the MFEs at each of the different domains, some embodiments provide transactional updates to the different failure domains. Specifically, in some embodiments, the master controller (or controller cluster) initially performs reconciliation of any global state conflicts between domains. The master controller then sends state updates enabling MFEs to receive packets with the new state to (i) the MFEs in its local domain and (ii) the controllers at the other domains, which in turn distribute the updates to their local MFEs. Next, the master controller sends out the updates for enabling the MFEs to send packets with the new state to both its MFEs and the controllers at the other domains, which again distribute the updates in turn to their local MFEs. Once the MFEs have received the new state information for sending traffic, they begin sending packets using the newly updated state (identified, e.g., by a version number appended to the packets), and the information to receive these packets is already in place.

The above description introduces the use of a network state storage to handle logical networks implemented across multiple failure domains. Several more detailed embodiments are described below. First, Section I describes in further detail the network controller storage design of some embodiments. Section II then describes reconciliation of the network state after failure domains have reconnected after a period of disconnect. Next, Section III describes the management of the data plane while the controllers at different failure domains are disconnected, and Section IV describes the propagation of transactional updates across physical domains after reconnection. Section V then describes context identifier assignment. Finally, Section VI describes an electronic system with which some embodiments of the invention are implemented.

I. Network Controller Database Design

As indicated, in some embodiments each network controller in a network control system that spans several failure domains manages a network state storage (e.g., a configuration database or other storage structure). The network state storage, in some embodiments, stores network state information for one or more logical networks that describes the logical network configuration (e.g., logical network policies, the logical network structure, etc.), the mapping of the logical network to the physical network, logical and physical network statistics (e.g., port statistics, etc.), instructions sent to MFEs to direct the forwarding of logical network packets by the MFEs, and other information.

In some embodiments, the configuration database or other storage is designed in such a way so as to tolerate disconnected domains (i.e., domains that cannot communicate with each other for some period of time). For instance, in some embodiments, the network state storage has three different types of sections:

(i) sections storing local network state, which are readable and writeable during disconnection of the failure domains;

(ii) sections storing a first type of globally-relevant network state, which are read-only during disconnection;

(iii) sections storing a second type of globally-relevant network state, which are readable and writeable during disconnection but require reconciliation between the domains upon reconnection of the domains.

The first type of globally-relevant network state, which are read-only during disconnection, are portions that if updated separately while the domains are disconnected, would result in problems upon the reconnection of the domains. The second type of globally-relevant network state, on the other hand, could cause problems upon reconnection if not reconciled, but are type of state for which reconciliation rules can be created in order to reconcile differences between domains after reconnection. The local network state is data that can change independently of the other domains, and in some cases need not even be shared with controllers at the other domains after reconnection.

With the above classification of data, the network control system of some embodiments includes a hierarchy of databases or hierarchy of data within a database. The hierarchical database(s) of some embodiments includes a hierarchical structure with the lower portions being both readable and writeable during domain disconnection, and the higher portions only readable during domain disconnection.

To determine which network state should be stored in which database (or which portion of the database), some embodiments identify properties of different types of state. In the network virtualization of some embodiments, state (i.e., the data stored in the configuration database) can be divided into two types. Some of the state represents purely logical elements, and thus dividing this state (and its ownership) between domains is difficult. As such, this type of state is less amenable for easy reconciliation after network partitioning (i.e., the disconnection of one of the failure domains) in some embodiments. However, even with network virtualization, some configuration state in some embodiments is purely local to the physical domain.

In order to establish rules for maintaining consistency, even with network virtualization, configuration state can be divided into two parts according to some embodiments of the invention:

(i) information with a clear physical owning domain; and
(ii) information without a physical owning domain.

In some embodiments, any conflicts in the information with a clear physical owning domain are reconciled in favor of the owner and the reconciling strategy is defined. Along the lines of routing protocols that operate in purely physical networks, each piece of this type of state information has clear ownership in some embodiments. That is, if information in the state storage of a controller at a first domain conflicts with information in the state storage of a controller at the owning domain, then the first domain state storage will be modified to reflect that of the owning domain of the particular information. For information without a physical owning domain, some embodiments define explicit reconciliation rules that guarantee state consistency (e.g., to ensure that the network policy remains correct).

In some embodiments, the network controller storage design builds on the clean separation of three types of state (local state, reconcilable global state, and non-reconcilable global state) described below. In designing such a configuration database, one determination is whether each type of state information has a separate sharing mechanism or whether a joint mechanism is used to share state information for the different types. If a single mechanism is used, then some embodiments require support for all state types within the particular storage mechanism used. Locally significant state is always writable in some embodiments, as modifications to the state will not result in any conflict (because the state is local). On the other hand, globally significant state requires special handling in some embodiments in case of physical network partitioning (disconnection of a failure domain).

A second determination is the degree to which the data should be localized (or not localized) in order to avoid stressing global mechanisms. For instance, the sharing of virtual machine (VM) location information may be avoided in some embodiments if gateways are introduced along a path. Because the gateway is treated as a single point of entry for the logical and physical networks, there will be no need to share VM information across a gateway.

Figure 3:
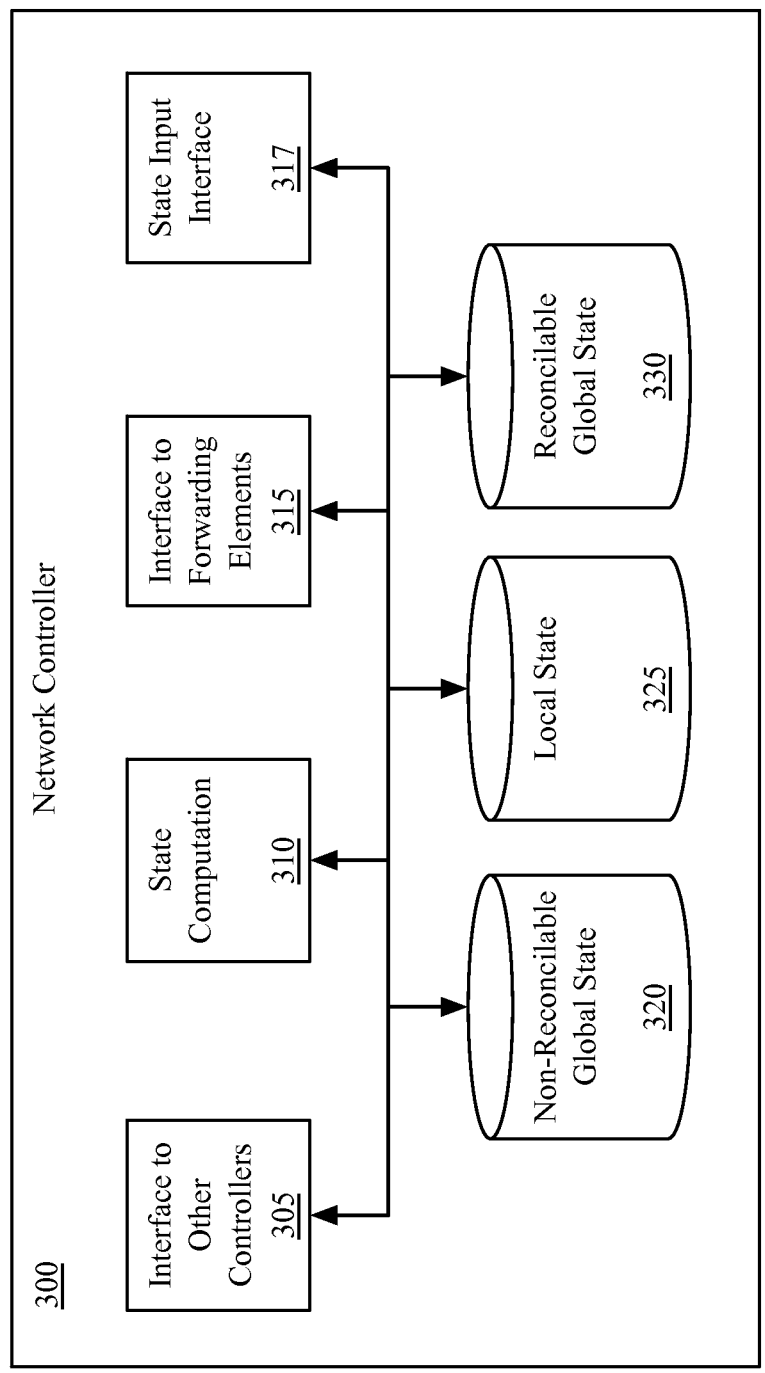
FIG. 3 conceptually illustrates a network controller of some embodiments with a set of databases that enables reconciliation after network disconnection.

FIG. 3 conceptually illustrates a network controller 300 of some embodiments with a set of databases that enables reconciliation after network disconnection. Specifically, the network controller 300 includes three interfaces 305, 315, and 317, a state computation module 310, and three storages 320-330 for storing non-reconcilable global state, local state, and reconcilable global state, respectively.

The interface 305 to other controllers enables the controller 300 to communicate with other network controllers in its domain as well as controllers in other domains in order to exchange network state information. In some embodiments, this communication may be through a Remote Procedure Call (RPC) channel or other connection. Through the interface 305, the network controller 300 passes state that it receives through the interface 315 (from MFEs that it manages) or the interface 317 (from, e.g., network administrator input) as well as, in some cases, state that it computes based on the input state. On the other hand, some embodiments only share configuration state (i.e., input state) and do not share computed state.

Network partitioning, at the control level, occurs when the controller 300 is unable to communicate with controllers at other domains through the interface 305. When the domains each have a controller cluster, this will not necessarily be due to the controller interface going down, but rather due to a network disconnection. If only the interface 305 were to fail, then in some embodiments one of the other controllers in the cluster could take over for the controller 300 and maintain communication with the controllers at other domains.

The state input interface 317 enables the controller to receive configuration data from, e.g., a network administrator (e.g., through an API). In some embodiments, the network administrator can provide configuration data to define a logical network. The configuration data may define logical forwarding elements, the connections between logical forwarding elements, global policies, logical forwarding element-specific or port-specific policies, etc. In addition, in some embodiments the controller 300 may receive queries regarding network state and return responses to those queries through the state input interface 317.

The interface 315 to managed forwarding elements (the MFE interface) enables the network controller to provide configuration state to the MFEs. This configuration state may simply be configuration settings (e.g., in the case of a hardcoded MFE such as ESX vSwitch) or flow entries that define the behavior of the MFE (e.g., in the case of a programmable MFE such as OVS). The MFE interface 315 also allows the network controller 300 to receive state information from the MFEs. This may include collection of statistics regarding the physical ports of the MFEs and/or the logical ports that the MFEs implement, other information that may cause the network controller 300 to perform additional state computation, etc.

The state computation module 310 of some embodiments uses the input received from the various interfaces 305, 315, and 317 to compute additional state information. For example, in some embodiments, the state computation module 310 receives a logical network configuration, and computes the state to pass down to the MFEs in order to direct the MFEs to forward packets for the specified logical network. This computed state, in some embodiments, includes flow entries that direct the packet processing of the MFEs. In some embodiments, the state computation module 310 includes a table mapping engine as described in U.S. Patent Publication 2013/0058228, which is incorporated by reference herein. In addition, in some embodiments, the state computation module 310 performs reconciliation of state information across domains upon reconnection of network controllers in other failure domains. In other embodiments, the network controller 300 includes a separate module for performing this reconciliation of state.

In addition to these modules, as shown in FIG. 3, the network controller of some embodiments includes three separate storages 320-330 for state information. These storages are the local state storage 325, non-reconcilable global state storage 320, and reconcilable global state storage 330. These storages, in some embodiments, make up a configuration database.

In some embodiments, the local state information storage 325 is a local highly available storage. This storage 325 stores data that does not at all affect the other domains. For example, in some embodiments the local state storage 325 stores local MFE statistics and state relating to the management of the local domain, as well as possibly other local state. The information relating to the local domain management, in some embodiments, may include data regarding the connection between the network controllers in the domain and the local MFEs (e.g., how the controller connects to the MFEs, the security configuration for use between the controller and the MFEs, etc. In addition, if the MFEs only connect to MFEs at the other domains through gateways located at the edge of the domains, then the network addresses (for use, e.g., in tunnels between MFEs) can be stored as local state information as this data will not be needed outside of the domain. In some embodiments, the local state storage is readable and writeable at all times, including when the network controller 300 is disconnected from controllers at other domains.

Some embodiments, either in conjunction with or as an alternative to the local storage, overload the global storage to save the local state information. To further localize the data, some embodiments aggregate the state information. Some such embodiments only allow gateways to interface with remote clusters, and do not share any internal state outside of the local cluster. This results in two layers of nested logical data paths. In addition, some embodiments use the nested structure due to time-sensitive local operations (e.g., VM migration).

The non-reconcilable global state storage 320 stores state that is (i) related to all of the domains across which a logical network is implemented and (ii) cannot be adequately reconciled between two domains after the domains have been disconnected for a period of time. In some embodiments, the non-reconcilable storage is read-only during disconnection between failure domains, so that conflicting and irreconcilable state will not be written to the storages in two different failure domains. Some embodiments use a serializable storage for the non-reconcilable global state 320, such as consensus-based RSM.

Different embodiments, however, may draw the line differently between state that can or cannot be reconciled after disconnection. In some embodiments, generic security policy configuration may be classified as non-reconcilable global state. For simple security policy, this may be reconcilable by always using the stricter policy; however, for more complex security policies, it may not be entirely clear which is stricter. Furthermore, as an example, an administrator at one domain might change the default security policy while an administrator at a different domain changes a port-specific policy based on a different assumption about the default domain. In this situation, there may not be an apparent automatic reconciliation policy, so the network controllers simply prevent these changes from being made while the controllers at different domains are disconnected. In general, security policies are not time-based, and therefore the reconciliation process cannot use the most recent state regarding a security policy when reconciling a different between two disconnected controller storages.

In addition to security policy, some embodiments treat context identifier assignment as non-reconcilable and therefore prevent such assignment during times of disconnection. Context identifiers are identifiers placed in packets to identify the logical context to which a packet belongs, and play a critical role in guaranteeing policy, as well as isolation between different logical networks (e.g., of different tenants). For example, context identifiers include identifiers used for logical ports, logical forwarding elements, etc. The repurposing of context identifiers in isolation could introduce a packet leak, resulting in a violation of policy. However, rather than making context identifiers completely unassignable during disconnection, some embodiments pre-allocate context identifiers for each failure domain. This context identifier pre-allocation is described in greater detail below.

The reconcilable global state storage 330 of some embodiments stores state that is (i) related to all of the domains across which a logical network is implemented and (ii) can be adequately reconciled between two domains after the domains have been disconnected for a period of time. In some embodiments, during times of disconnection, the reconcilable global state storage 330 is readable and writeable, but subject to change after post-connection reconciliation. These updates are therefore effective locally (within the controller's domain) even before reconnection. In some embodiments, in addition to storing updates in the reconcilable global state storage 330, the network controller also stores the updates in a reconciliation queue.

The reconciliation queue is a queue (e.g., on the interface 305 to the other controllers) of updates made to global state at the network controller 300 during disconnection. Upon reconnection, the controller sends out these state updates to a master controller, which performs reconciliation of the state and sends finalized updates to network controllers at all of the affected domains. For this role, a single failure domain is the logical master in some embodiments (i.e., the network controller or storage of a controller at a single failure domain). As described in greater detail below, some embodiments reconcile state on a time-stamp basis (e.g., for logical port locations), or based on other rules (e.g., always choosing a stricter security policy).

Figure 4:
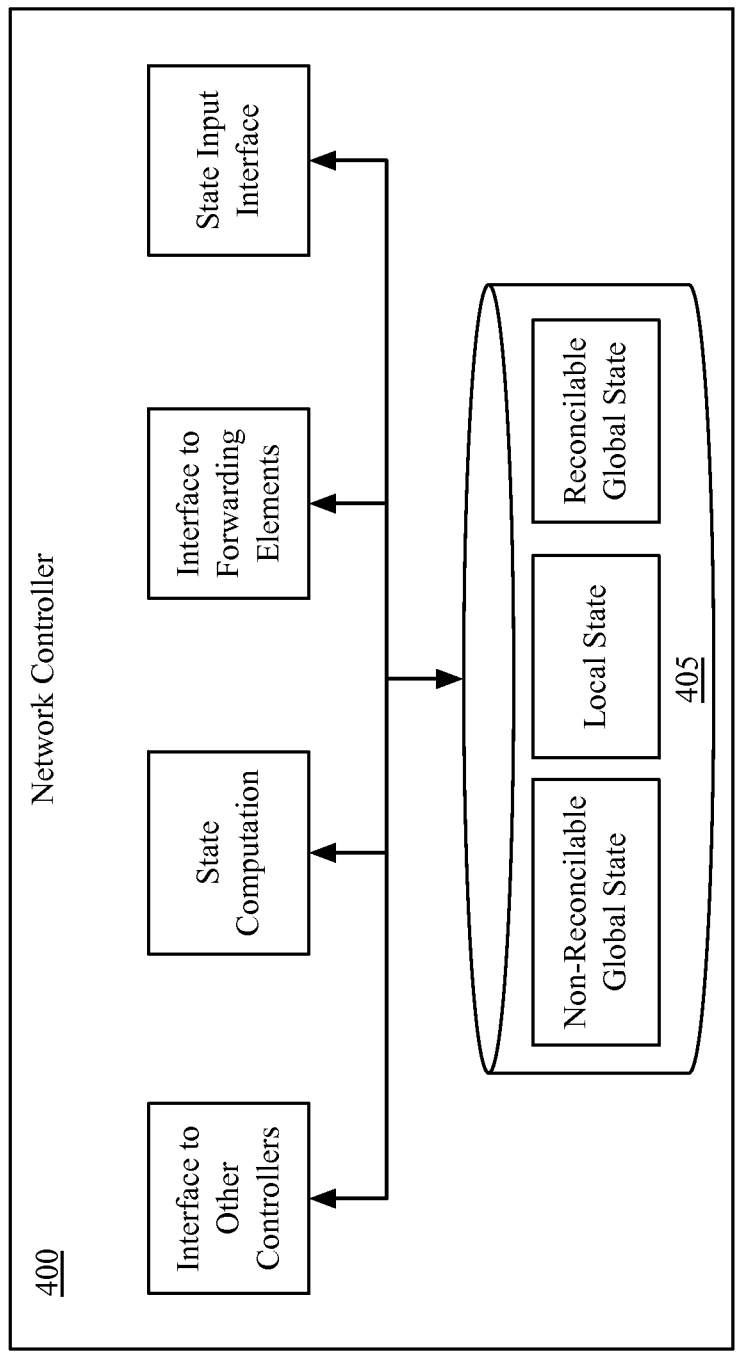
FIG. 4 conceptually illustrates a network controller that is the same as the controller of FIG. 3 except that all three types of state are stored in the same storage.

While FIG. 3 illustrates the three storages 320-330 as separate (e.g., as separate databases), in some embodiments, the implementation actually combines the different types of storage into a single database. FIG. 4 conceptually illustrates a network controller 400 that is the same as the controller 300 except that all three types of state are stored in the same storage 405. This storage might be, for example, a segmented database. Though stored in the same storage 405, the three types of state nevertheless have their different read/write properties as described above.

As indicated, the different types of state have different read/write properties upon disconnection of a network controller from the controllers at other domains. In some embodiments, the network controller allows all types of state changes when it is connected to all other controllers at other domains. For globally-relevant changes, the controller propagates the updates to the other controllers in addition to storing the state updates in the appropriate portion of its local storage.

Figure 5:
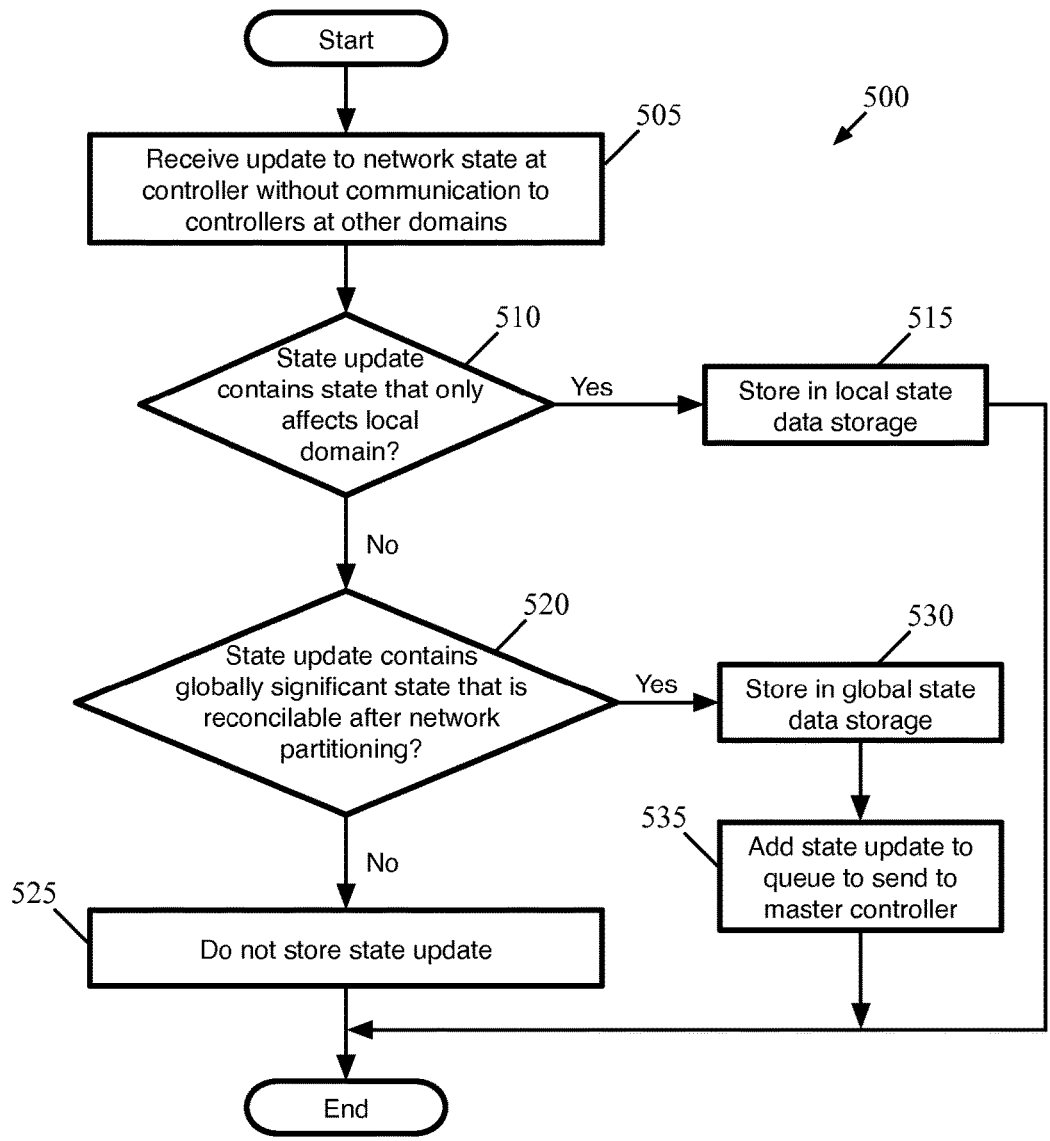
FIG. 5 conceptually illustrates a process of some embodiments for receiving and storing state updates when a controller is disconnected from at least one other controller.

FIG. 5 conceptually illustrates a process 500 of some embodiments for receiving and storing state updates when a controller is disconnected from at least one other controller. In some embodiments, whether a controller is disconnected is partly determined by the nature of the state update. For example, when a state update involves context identifier assignment, then if the controller is disconnected from any other controllers the disconnection is relevant, because such identifier assignment can affect all logical networks. On the other hand, if the state update involves only a single logical network or logical forwarding element (e.g., a modification to a security policy for a specific logical port), some embodiments only treat the network controller as disconnected if it cannot connect to the controllers located at a domain at which the logical forwarding element or logical network is implemented.

Figure 6:
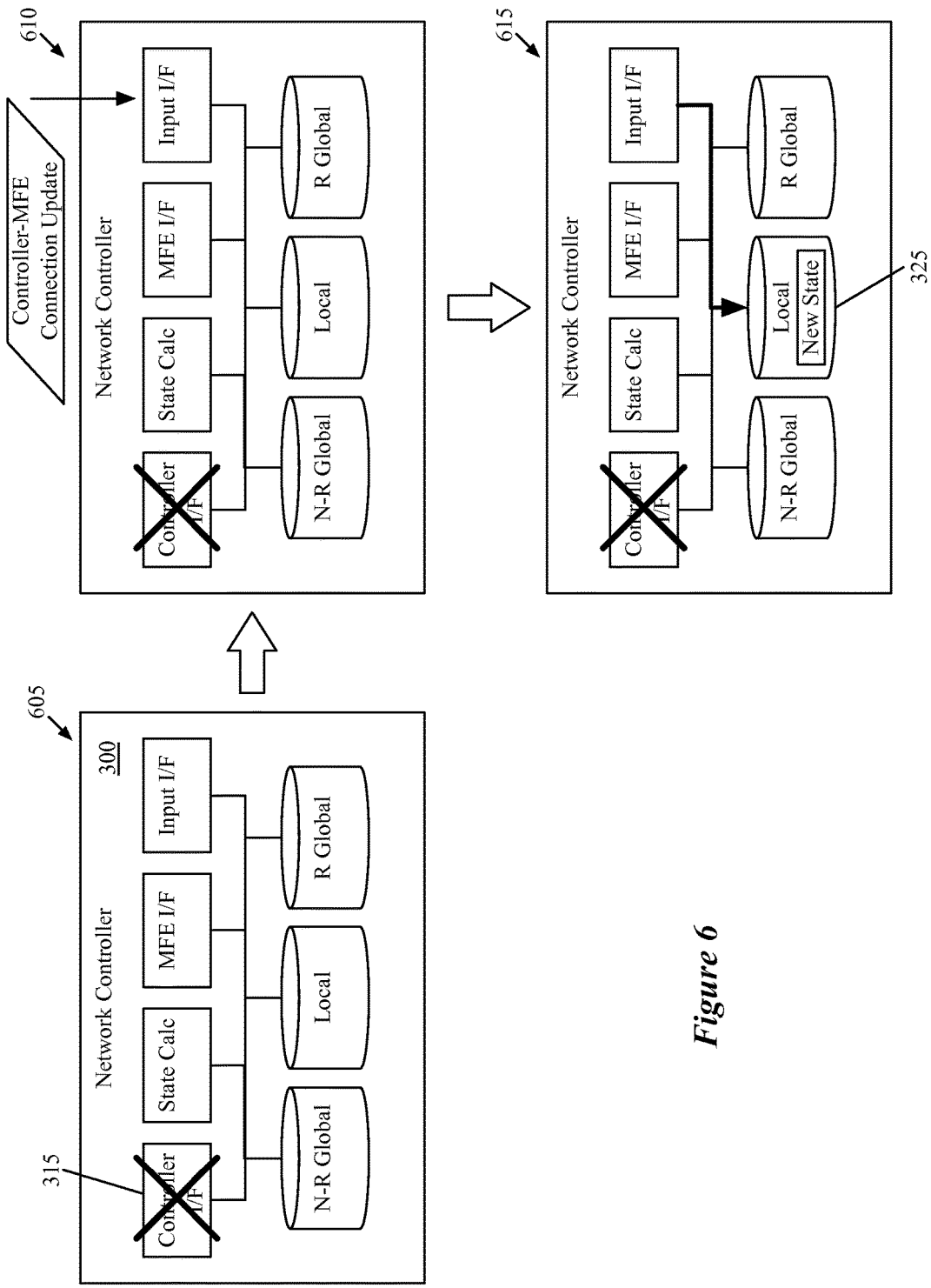
FIG. 6 conceptually illustrates the receipt and storage of local state information.

The process 500 will be described in part by reference to FIGS. 6-8, which illustrate the network controller 300 receiving various different types of state updates during a period of disconnect and the controller's response to these updates. In each of these figures, the controller interface 315 is shown as being down. This does not mean, necessarily, that the interface itself is disrupted, but rather represents that the connection between the controller 300 and network controllers at other failure domains has been disrupted.

As shown, the process 500 begins by receiving (at 505) a network state update at a network controller (in a first domain) that does not currently have communication with controllers at other domains. As mentioned, the determination as to whether a controller is cut off from other controllers depends on the logical network to which the state update is related, in some embodiments.

The process then determines (at 510) whether the updated state only affects the local domain. For example, state relating to the management of the local MFEs by the network controller is state that is purely local. Thus, modifications to the connection between the controller and the MFEs, including security configuration, connectivity information, etc. is classified as purely local state. In addition, purely physical statistics received from the MFEs (as opposed to statistics for logical constructs, such as logical ports) may be considered local state as well. The process 500 then ends.

When the state update is for local state data, the process stores (at 515) the state update in the local state data storage. FIG. 6 conceptually illustrates the receipt and storage of such local state information over three stages 605-615 of the network controller 300. As shown in the first stage 605, the controller interface 315 is down, indicating that the network controller is unable to communicate with the network controllers of at least one other domain (though not necessarily due to the failure of the interface on the controller itself). In the second stage 610, the network controller 300 receives an update modifying the connection between itself and one or more of the MFEs that it manages (e.g., a modification to the encryption or other security measures, etc.). This is an example of an update that is purely local in nature. As such, the third stage 615 illustrates that the controller stores this data into the local state storage 325 in order to effectuate the update. As this state is purely local, there are no issues with committing to the new state, despite the disconnection.

Returning to the process 500, when the state update does not affect only the local domain, the process determines (at 520) whether the state update includes globally significant state that is reconcilable after network partitioning (i.e., after the network controllers have reconnected). Different embodiments may use different determinations as to what global state is considered reconcilable, based on the willingness to accept complexity in the reconciliation rules. For example, security policies could be reconcilable in most cases, so long as the controller developer is willing to create complex rules for handling all the possible conflicts in those security policies. Other embodiments might simply prevent security policies from being modified during times of disconnection, in order to avoid the complex reconciliation rules. Other types of network state that are considered reconcilable include logical port location (which could change, for instance, due to VM migration).

When the state update is considered to be of a type that is not reconcilable across domains, the process does not store (at 525) the state update. In some embodiments, if the source of the state update was the API, the network controller returns an error message through the API to inform the user that the particular network state cannot be modified at this time because of the disconnection between controllers. The process 500 then ends.

Figure 7:
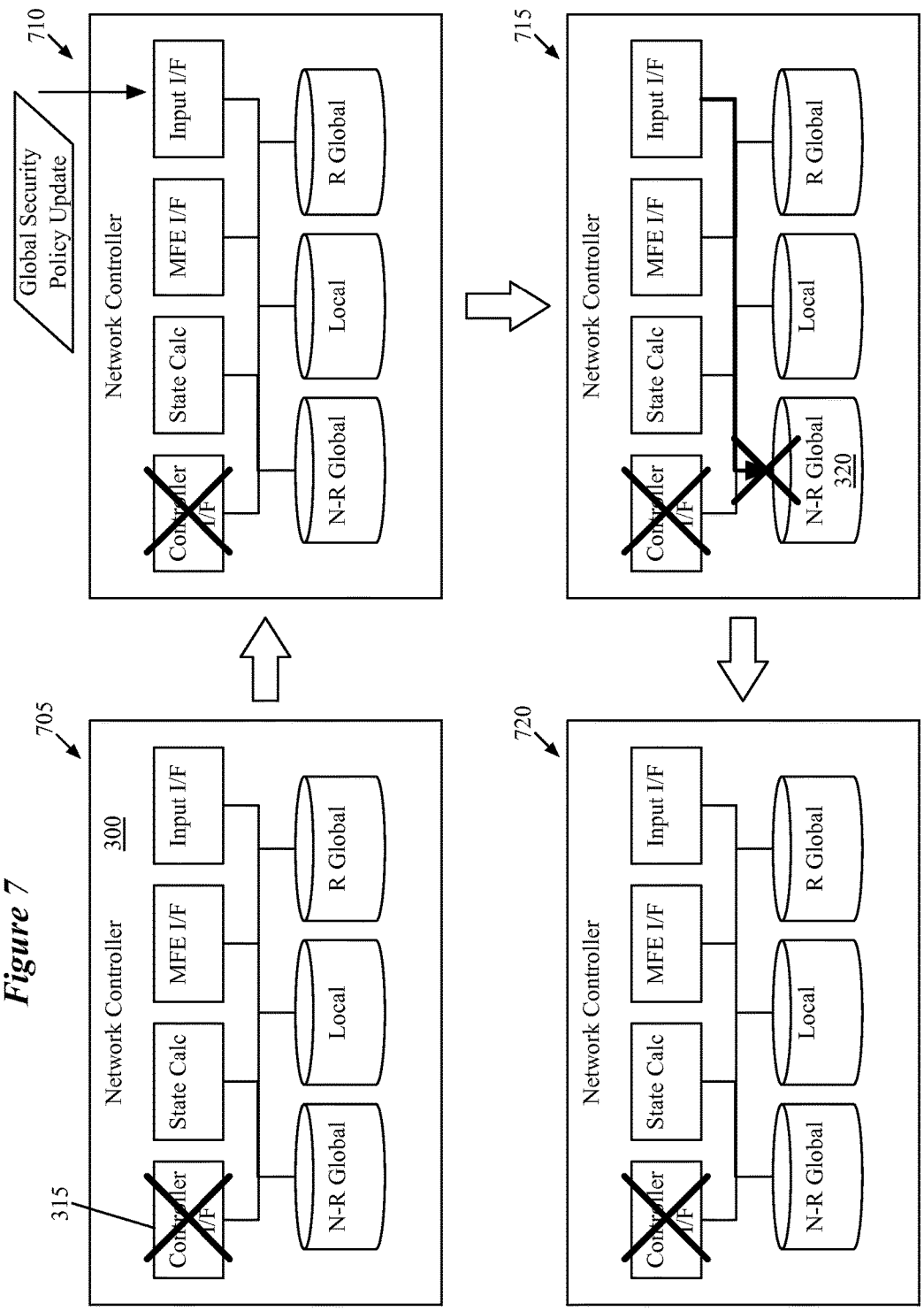
FIG. 7 conceptually illustrates the receipt of non-reconcilable global state information.

FIG. 7 conceptually illustrates the receipt of such non-reconcilable global state information over four stages 705-720 of the network controller 300. As shown in the first stage 705, the controller interface 315 is down, indicating that the network controller is unable to communicate with the network controllers of at least one other domain (though not necessarily due to the failure of the interface on the controller itself). In the second stage 710, the network controller 300 receives an update modifying global security policy (e.g., a default policy for a logical network, etc.). This is an update that is considered non-reconcilable global state in some embodiments, including the example. As a result, the third stage 715 illustrates that this data is not stored in the non-reconcilable global state storage 320, because this storage is made read-only while the controller 300 is disconnected from other domains. Thus, in the fourth stage 720, no new state is stored by the network controller 300.

Returning again to the process 500, when the state update is an updated to reconcilable global state, the process stores (at 525) the state update in the global state data storage on the network controller. In some embodiments, this state can then be acted upon (e.g., distributed to MFEs within the local domain, further state can be calculated, etc.). However, the state (and any additional state computed therefrom) is subject to change after reconnection and reconciliation by the master controller.

In addition to storing the state update, the process adds (at 530) the received state update to a queue of such updates to be sent to a master controller. In some embodiments, the set of controllers (or set of domains) elects a master controller for reconciliation purposes. In some embodiments, a separate master is elected for each logical network managed by a set of controllers; in other embodiments one master is elected for all of the interconnected domains. Each non-master controller, when disconnected, store a queue of reconcilable globally-relevant updates for distribution to the master controller. Upon reconnection, the network controller sends these queues to the master, in order for the master to reconcile the updates with any conflicting state information. The process 500 then ends.

Figure 8:
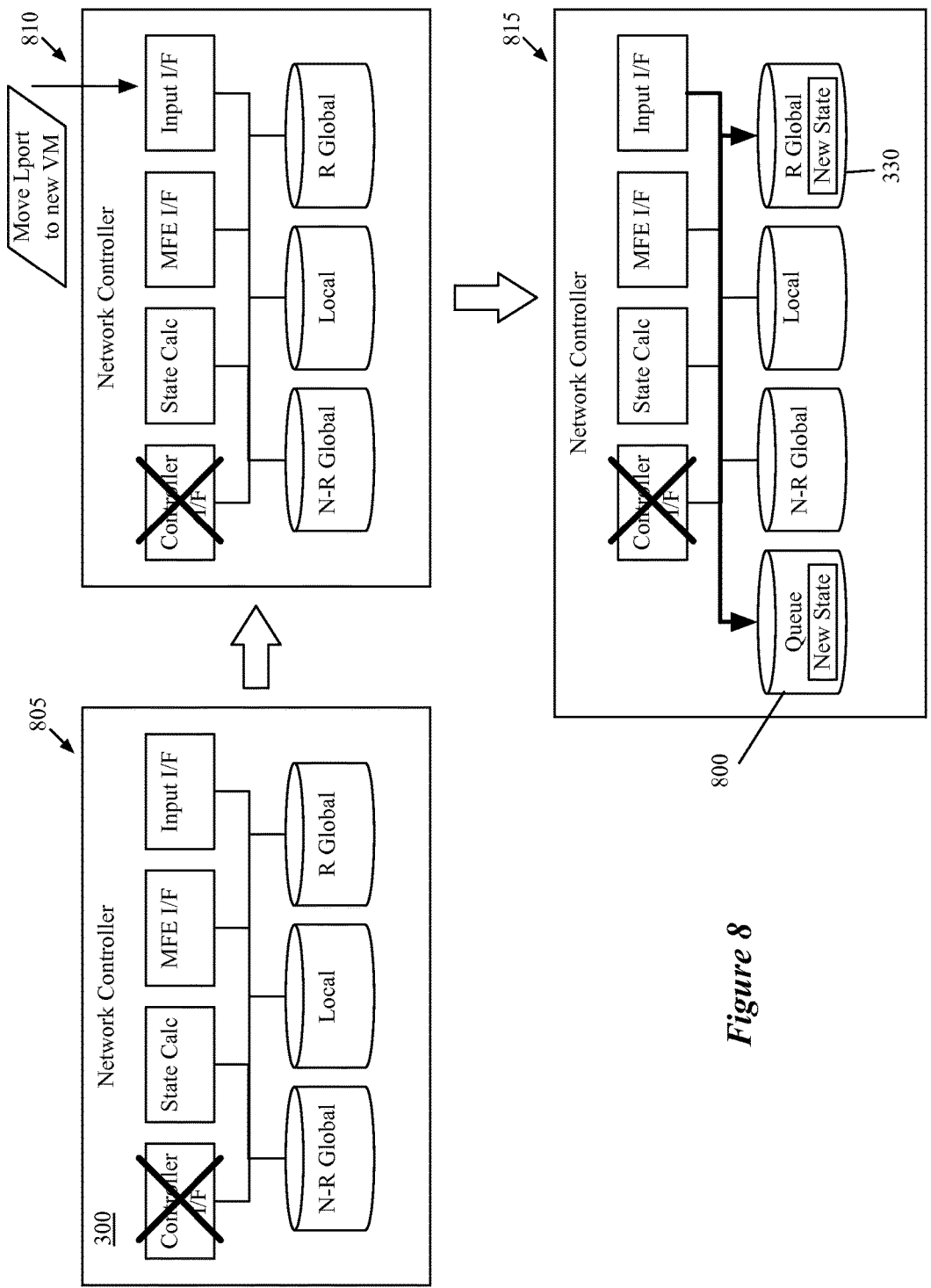
FIG. 8 conceptually illustrates the receipt and storage of reconcilable global state information.

FIG. 8 conceptually illustrates the receipt and storage of such reconcilable global state information over three stages 805-815 of the network controller 300. As shown in the first stage 805, the controller interface 315 is down, indicating that the network controller is unable to communicate with the network controllers of at least one other domain (though not necessarily due to the failure of the interface on the controller itself). In the second stage 810, the network controller 300 receives an update to move an existing logical port to a different VM located within the domain. This has global consequences, but is also the sort of update that can be reconciled after reconnection of the domains (e.g., using a time-based reconciliation policy). As a result, the third stage 815 illustrates that the controller stores this data into the reconcilable global state storage 330. In addition, the controller 300 stores the state update into a queue 800, for later distribution to a master reconciliation controller.

The queue 800, in some embodiments, is a queue on the interface between the controller 300 and the master controller. In some embodiments, the controller actually has several controller interfaces with several controllers rather than just the one interface 315. In other embodiments, the controller has the single interface, but stores several queues on the interface for different destinations (e.g., if there are multiple master controllers for different logical networks).

Figure 9:
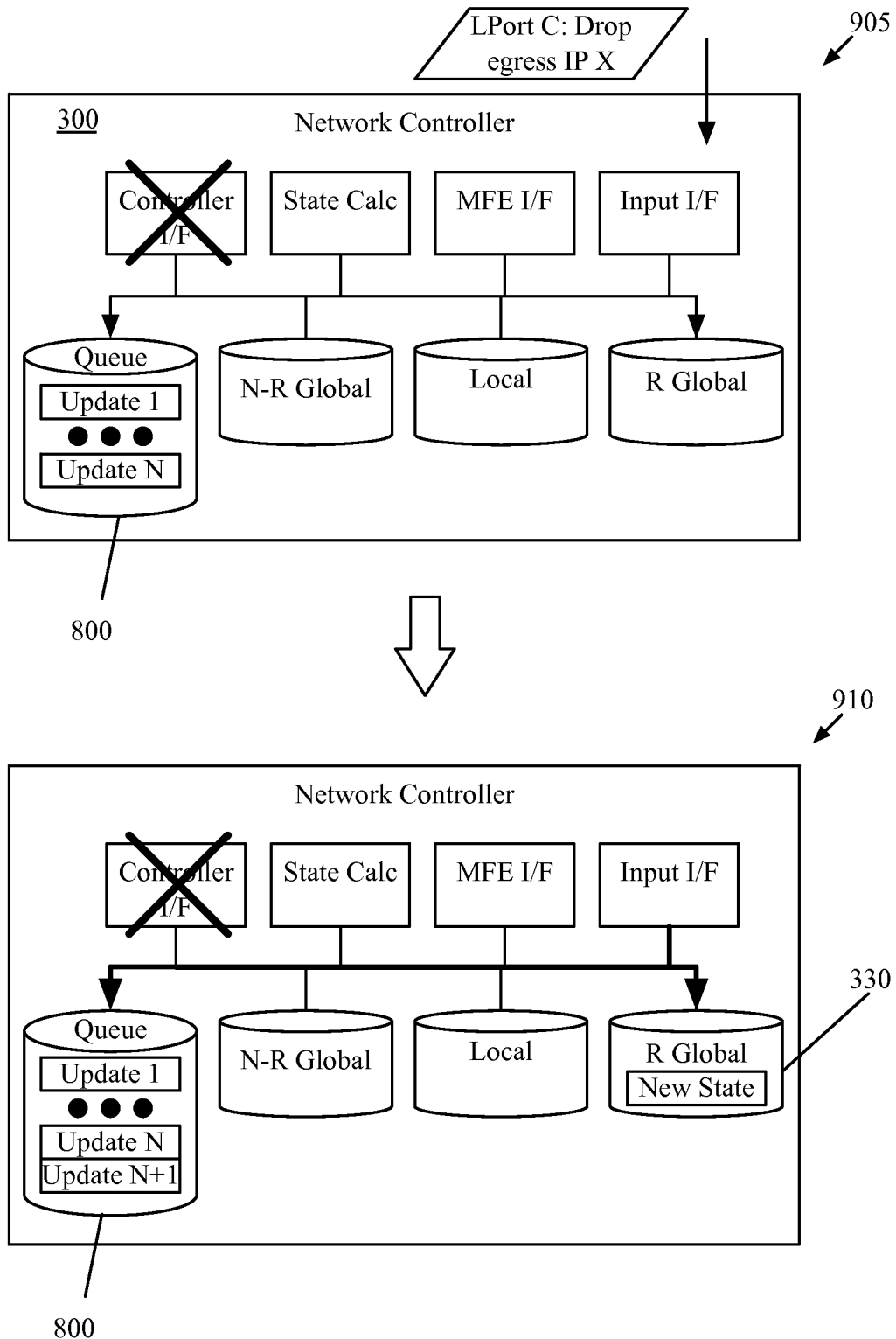
FIGS. 9 and 10 conceptually illustrate the operation of the a queue of some embodiments during disconnection from the master controller.
Figure 10:
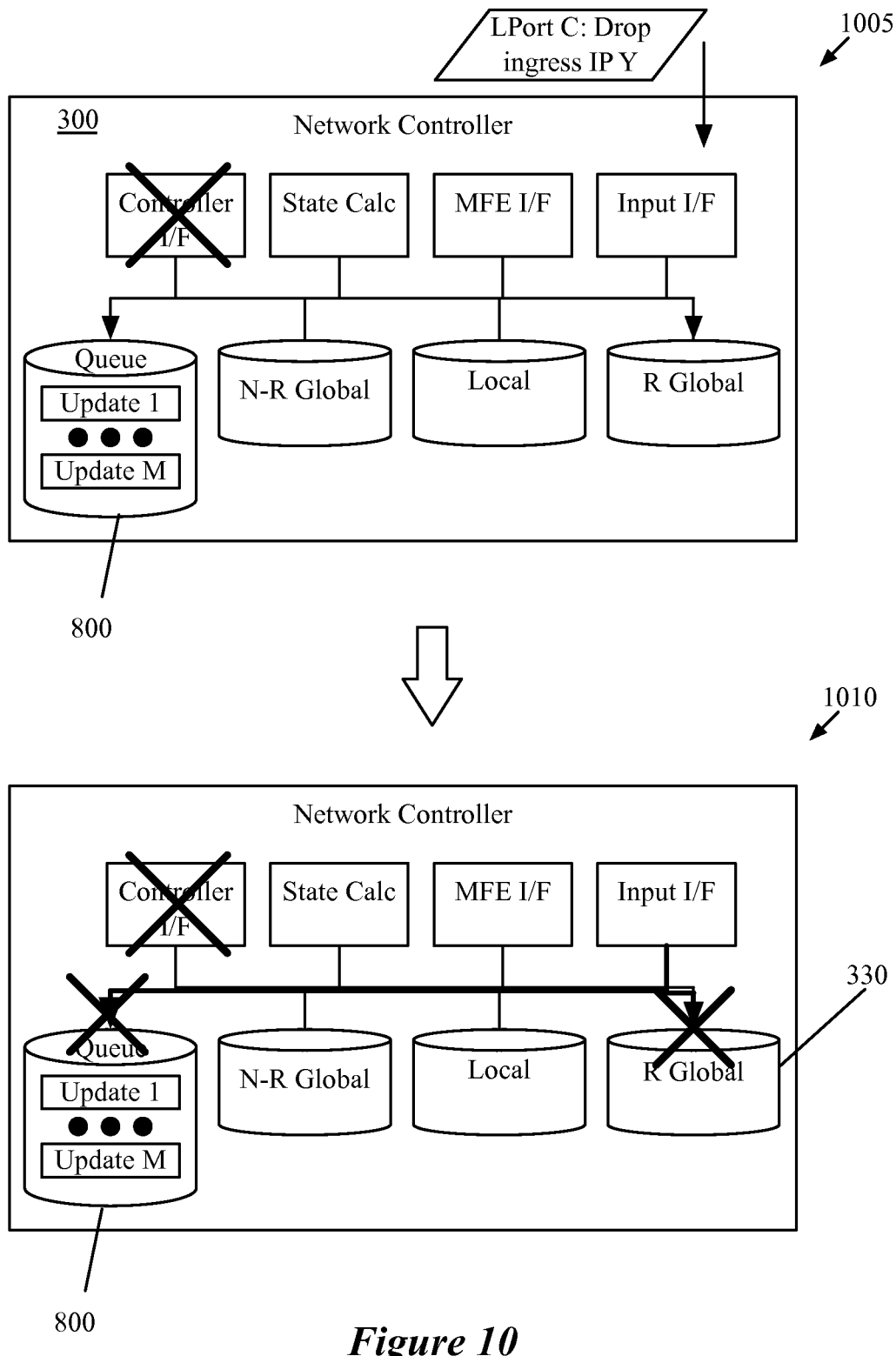

FIGS. 9 and 10 conceptually illustrate the operation of the queue 800 of some embodiments during disconnection from the master controller. Specifically, in FIG. 9 an update is added to the queue over two stages 905-910, while in FIG. 10 the queue has filled up and thus no more global state can be modified at the controller.

In the first stage 905 of FIG. 9, the network controller 300 receives a state update to modify the properties of a particular logical port. Specifically, the update specifies for MFEs to drop packets sent from logical port C to the network (IP) address X. In some embodiments, including the example shown here, this is a security policy update that can be reconciled upon reconnection. At this point, the queue 800 includes N state updates to the reconcilable global state, which will be sent to the master controller in order upon reconnection. In the second stage 910, the network controller 300 stores the new state in the reconcilable global state storage 330. In addition, the controller adds the new update to the end of the queue 800, thereby increasing the size of the queue.

The queue, however, has a maximum size in some embodiments (e.g., a maximum number of updates that can be stored in the queue). After the maximum size has been reached, the queue will no longer accept updates. At this point, the reconcilable global storage becomes read-only, because updating the reconcilable storage without sending the update to the master controller could cause a conflict after reconnection.

FIG. 10 conceptually illustrates an attempt to modify the global state after the queue 800 has reached its maximum capacity over two stages of the network controller 300. As shown at the first stage 1005, the queue has M updates stored, which is the maximum number of updates that the queue can hold at once (M>N). At this point, the controller 300 receives a state update to again modify the properties of logical port C, this time to specify for MFEs to drop packets sent to logical port C with the network address Y. However, because the queue is full, the controller does not have a mechanism for transmitting the update to the master controller post-reconnection. As such, the second stage 1010 illustrates that the controller does not allow the state update to be saved to the global state storage 330 or the queue 800.

II. Reconciling Network State after Disconnect

When global state information is modified at a disconnected controller, this state needs to be shared with controllers at other domains upon reconnection. However, conflicting state changes may have been made at the controllers in other domains during the disconnect, and the conflicting state must be resolved in order to guarantee state consistency. Accordingly, some embodiments designate a master controller or master domain, which handles reconciling conflicting policy upon reconnection.

For information without a physical owning domain (i.e., globally-relevant state), some embodiments define explicit reconciliation rules that guarantee state consistency (e.g., to ensure that the network policy remains correct). In defining these reconciliation rules, some embodiments ensure that security policies become stricter after reconciliation. For example, when choosing between a security policy for a particular port stored in a first domain and a second domain, some embodiments select the stricter policy (e.g., dropping rather than allowing packets). In addition, as a general property of the reconciliation, some embodiments ensure that reconciliation does not introduce loops (i.e., packets being sent in an infinite loop path due to contradicting reconciled state information), and possibly introduce other conditions on the paths taken between points in the network.

The following discusses practical reconciliation rules of some embodiments in order to realize these goals. However, as indicated above, for some state information such reconciliation rules cannot be established in some embodiments. In these cases, the goal is to render such configuration options and state read-only while the network is partitioned (i.e., while one of the physical domains is disconnected).

In designing such reconciliation rules, due to difficulties in reconciling policies in a manner that guarantees the policy objective, some embodiments use an approach that begins by mostly assuming that the state is read-only in the presence of network partitioning (disconnect). Some such embodiments then only gradually add modifiable state (i.e., make state locally writeable during disconnection and globally reconciled after reconnection) if the correctness assumptions can be proven for the state.

Several results flow from these decisions. First, logical networks may be added in isolation, because the new master may be assigned to the local controller cluster. Second, any newly created unique elements (e.g., ports) do not result in conflicts. That is, the existence of a logical port will not require a reconciling mechanism, assuming, e.g., that existing policies do not depend on the number of ports, and that the logical port identifier is reserved for use only by the domain at which the logical port is created. Third, logical to physical binding information can be reconciled based on time-ordering. That is, whichever forwarding element has last seen a particular binding of a logical port to a particular port hosting the VM associated with the logical port can be assumed to have the correct binding.

In some embodiments, reconciling logical policies requires the enforcement of an invariant. Specifically, security policies may only become more restrictive due to reconciling (e.g., in favor of dropping packets over allowing transmission of packets). Otherwise, in some embodiments reconciliation is solely time-based. Under the assumption that the security features do not interact with each other, then whether to use a time-based reconciliation versus a stringency-based reconciliation becomes a per-feature decision-making process in some embodiments. If a feature is both disabled and enabled, then some embodiments select the option that is more strict.

Figure 11:
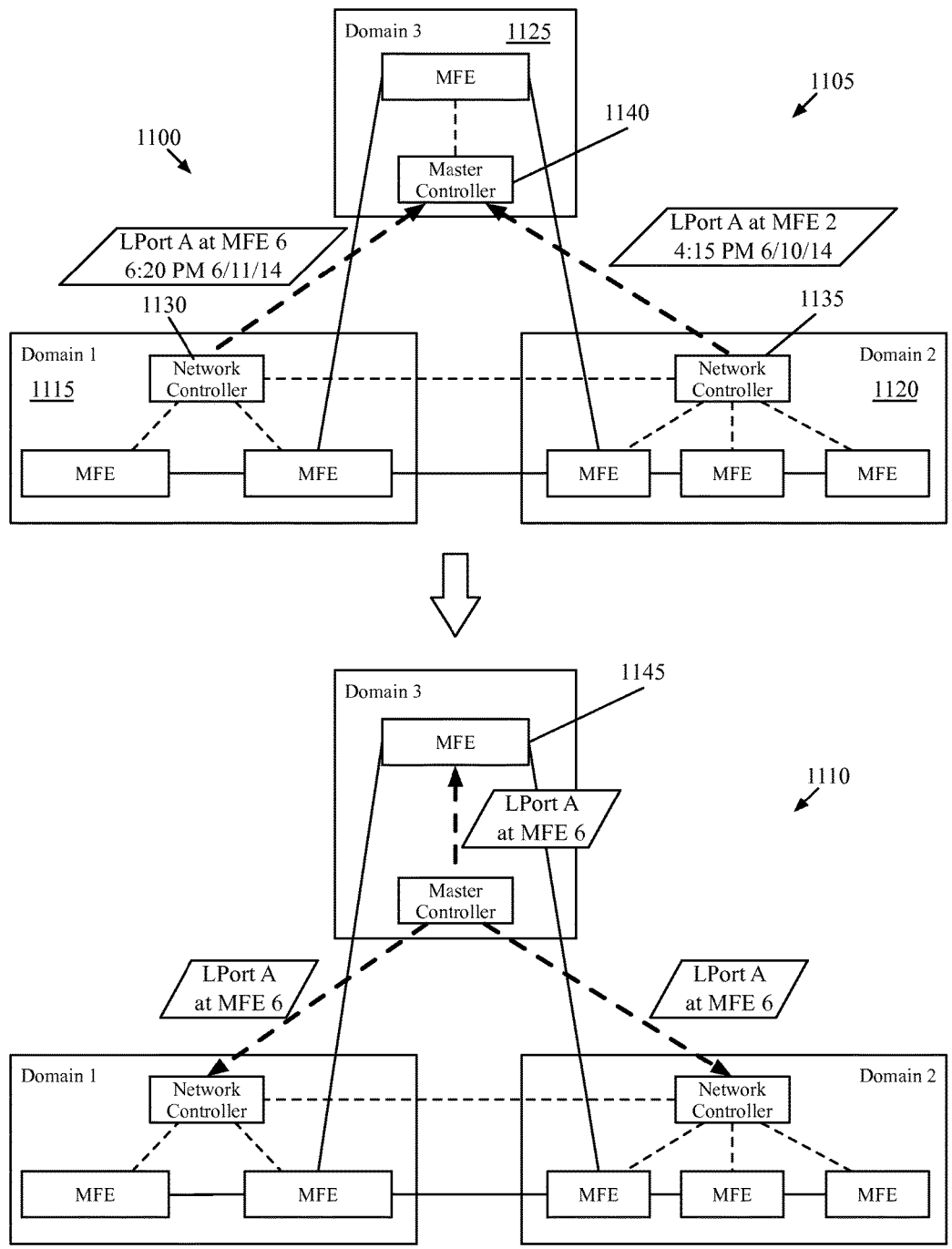
FIGS. 11 and 12 conceptually illustrate examples of reconciling globally-relevant state after reconnection of network controllers at different domains.
Figure 12:
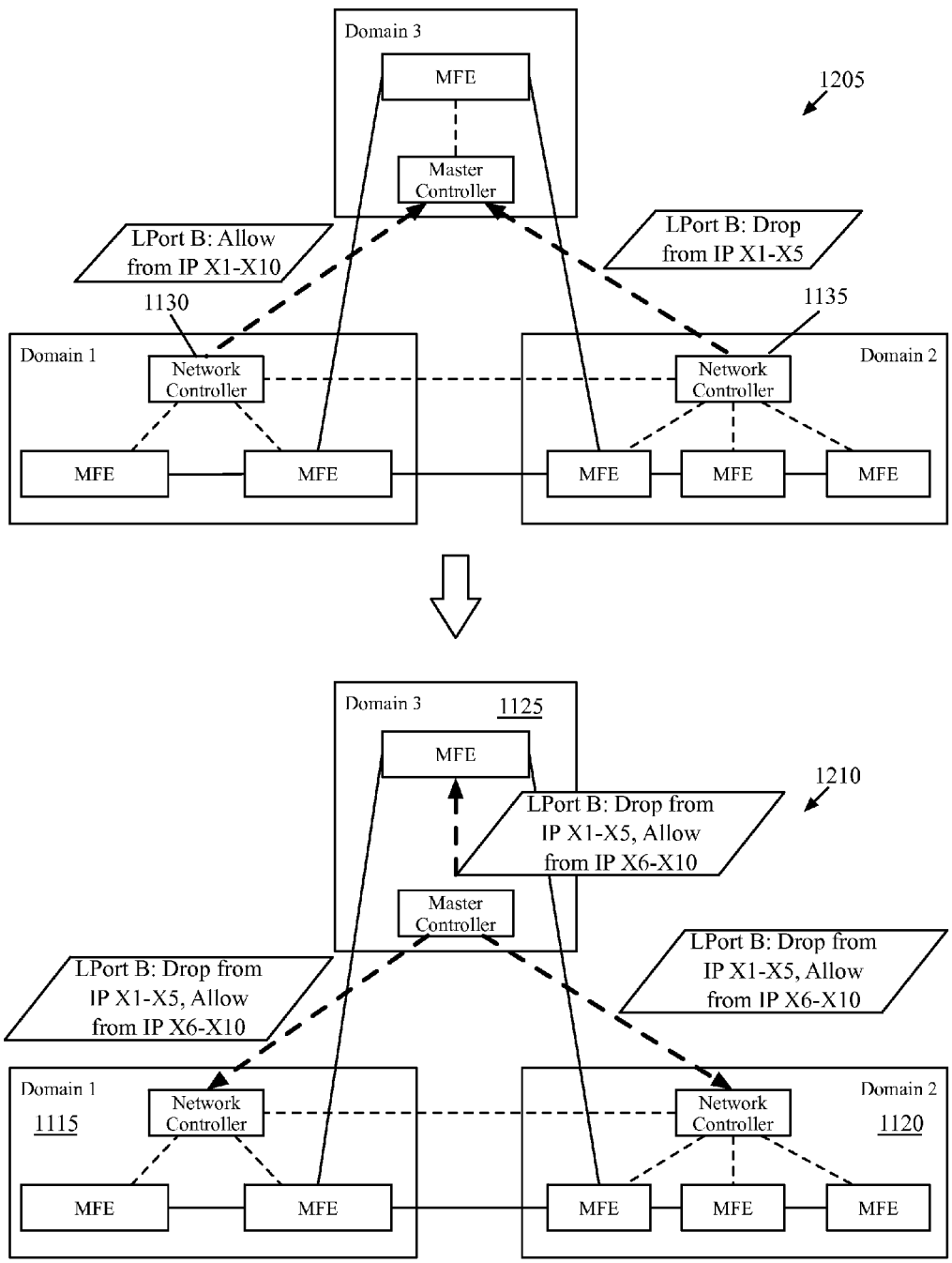

FIGS. 11 and 12 conceptually illustrate examples of reconciling globally-relevant state after reconnection of network controllers at different domains for a network 1100. FIG. 11 illustrates, over two stages 1105 and 1110, the reconciliation of logical port locations (i.e., VM locations). As shown in the first stage 1105, the network 1100 includes three domains 1115-1125, each of which has a network controller 1130-1140, respectively. For state conflict reconciliation purposes, the network controller 1140, located in the domain 1125, has been elected as a master controller.

Some embodiments use a deterministic consensus protocol that operates at each of the controllers in order to choose a master controller. For instance, some embodiments use the Zookeeper software, or a similar function that is guaranteed to produce the same result at each of the controllers so that all of the controllers will make the same decision regarding which should be the master controller.

The first stage 1105 illustrates the controllers shortly after the network controllers have resumed connection following a period of disconnection. At this point, the network controllers 1130 and 1135 each send their respective queues of state updates to the master controller 1140, which may also have its own set of state updates stored. In this case, the first network controller 1130 reports that a particular logical port (port A) has been identified at a particular MFE (MFE 6). This indicates that the network controller believes that the VM (or other entity) corresponding to the logical port A of a particular logical forwarding element is located on a host identified by the MFE operating on the host (and therefore the tunnel endpoint for packets sent to the logical port A, in some embodiments). This state update has a timestamp of 6:20 PM on 6/11/2014.

The second network controller 1135 provides a similar state update regarding the location of the logical port A, except that this state update from controller 1135 identifies a different MFE (MFE 2) as the location for the VM corresponding to the logical port. This second state update has a timestamp of 4:15 PM on 6/10/2014.

The master controller then reviews the state updates, as well as any potentially conflicting state stored in its own global state storage (e.g., in case it has a different location stored for the logical port A). For certain types of state including the location of a logical port, the master controller uses a time-based reconciliation process. The controller 1140 can trust that the location at which a VM corresponding to the logical port was seen most recently is the actual location of that logical port. As such, the master controller commits the location of the logical port at MFE 6 to its own stored state.

In addition, as shown in the second stage 1110, the master controller 1140 distributes the reconciled state to the controllers 1130 and 1135 at the other two domains 1115 and 1120. The master controller 1140 also distributes this reconciled state and/or any state computed from the reconciled state (e.g., flow entries for directing MFE forwarding) to its local MFE 1145, and the other controllers 1130 and 1135 would do the same.

FIG. 12 conceptually illustrates, over two stages 1205 and 1210 of the network 1100, the reconciliation of security policies for a particular logical port. The first stage 1205 again illustrates the network controllers 1130-1140 shortly after the controllers have resumed connection following a period of disconnection. At this point, the network controllers 1130 and 1135 each send their respective queues of state updates to the master controller 1140, which may have its own set of state updates stored. In this case, the first network controller 1130 reports that a security policy for logical port B has been modified to allow packets sent from a set of network addresses X1-X10 to be sent to the logical port.

The second network controller 1135 provides a similar state update regarding the security policy for the logical port B. However, this state update specifies to drop packets sent from network addresses X1-X5 to logical port B, but does not specify a policy for packets sent from network addresses X6-X10 to logical port B.

The master controller 1140 does not use a time-stamp based reconciliation policy for these security-related state updates, as there is no guarantee that a more recent security policy is the correct one. Instead, some embodiments always use the stricter security policy, favoring dropping packets rather than potentially allowing a packets to be sent through that should be dropped. Thus, the master controller 1140 uses the security configuration state from the second network controller 1135, to drop packets sent from the network addresses X1-X5. However, as only the update from the first network controller 1130 specified a policy for network addresses X6-X10, these packets will be allowed.

As shown in the second stage 1210, the master controller 1140, located in domain 1125, distributes the reconciled state to the controllers 1130 and 1135 at the other two domains 1115 and 1120. The master controller 1140 also distributes this reconciled state and/or any state computed from the reconciled state (e.g., egress ACL flow entries directing the MFE to drop packets forwarded to logical port B having a source network address of X6-X10) to its local MFE 1145, and the other controllers 1130 and 1135 would do the same.

Figure 13:
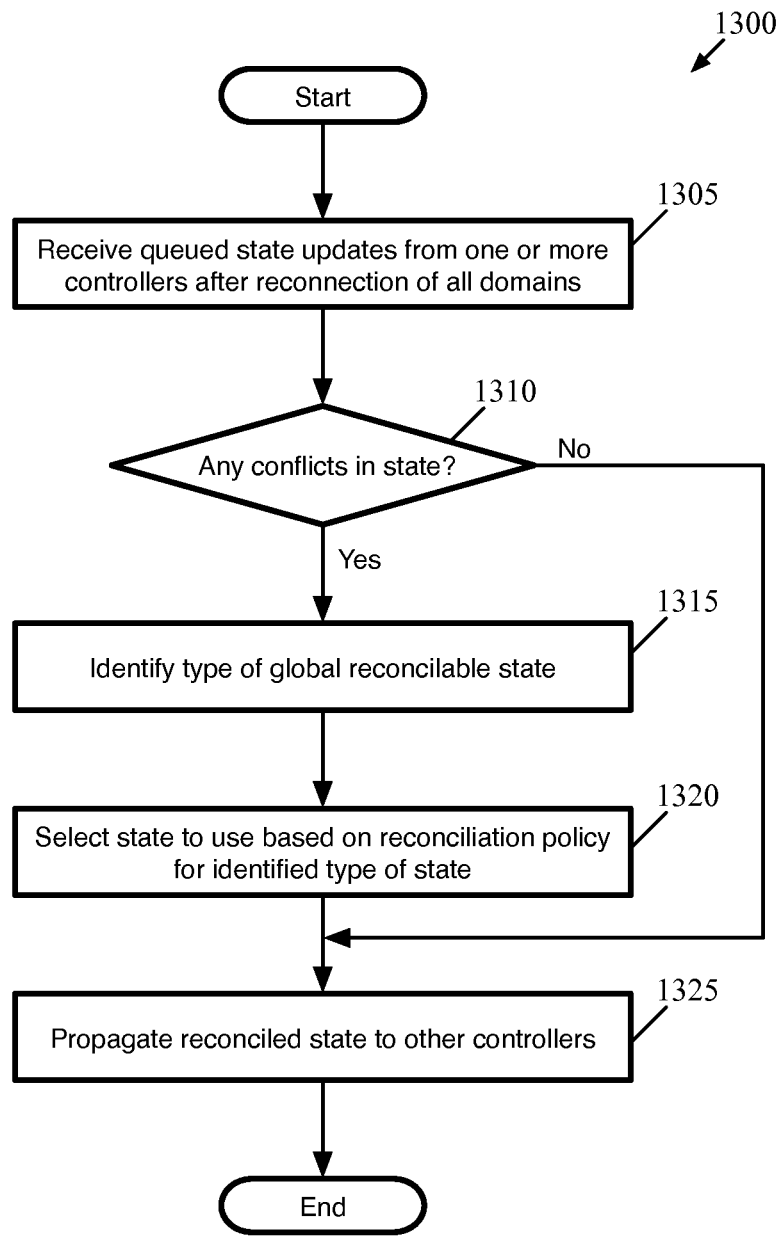
FIG. 13 conceptually illustrates a process 1300 of some embodiments for performing reconciliation of state updates after network controllers at different domains have reconnected.

FIG. 13 conceptually illustrates a process 1300 of some embodiments for performing reconciliation of state updates after network controllers at different domains have reconnected. In some embodiments, the process 1300 is performed by a master controller or master controller cluster that has been elected using a deterministic consensus protocol.

As shown, the process begins by receiving (at 1305) queued state updates from one or more controllers after reconnection of all domains. In some cases, controllers at a first domain might be cut off from the master controllers, while controllers at a second domain are not. In some embodiments, the controllers at the second domain would send their state updates to the master controller during this period, and therefore upon reconnection of the first domain controllers, no additional updates need to be sent. However, the controllers at the first domain would send their updates at this time.

The process, having received the state updates, determines (at 1310) whether there are any conflicts in the state. In some embodiments, as each update is received, the master controller compares the update to (i) any state updates received from other controllers at other domains and (ii) its stored state. If the state update is new (e.g., the creation of a new logical port) and has no conflicting state from other domains, the controller will commit the state and no reconciliation is required. In addition, the state update might agree with the state already stored by the master controller and other controllers, in which case no reconciliation is required.

However, when a conflict exists, the process 1300 identifies (at 1315) the type of global reconcilable state. Certain types of state will not be received in updates, either because the state is purely local (and therefore not shared) or non-reconcilable (and therefore updates are not allowed during periods of disconnection). However, among the types of globally-relevant state that can be updated during network partitioning, different types may use different reconciliation rules. Thus, the master controller determines whether the conflicting state is a security rule, a logical port location, etc.

Based on the identified type of state, the process selects (at 1320) the state to use for the logical network using a reconciliation policy specified for the identified type of state. For instance, some embodiments use time-based reconciliation for some state in which the controller can assume that the most recent state update is the correct one (e.g., the MFE at which a logical port is located, etc.). For other types of state, different reconciliation policies might be used. As mentioned, for security policies, some embodiments resolve such conflicts in favor of stricter policy that lets through fewer packets (to the extent that changes to security policies are allowed during network partitioning).

After reconciling the state, the process 1300 propagates (at 1325) the reconciled state to other network controllers. This propagated state, in some embodiments, includes not just the results of conflicting state, but new state updates for which there was no conflict. Thus, if a first controller reports a new logical port and sends this information to the master controller, the master controller is responsible for propagating the new logical port information to controllers at other domains which may not be aware of the new logical port. In addition, the master controller (and, subsequently, other controllers) performs any computations based on the new network state, and propagates any necessary data to the MFEs in order for the MFEs to process packets using the correct state.

III. Managing MFEs During Controller Disconnection

In addition to the ability to reconcile conflicts in global configuration state, disconnections require considerations beyond the control plane (i.e., the state managed by the controllers) in some embodiments. While the control plane may be partitioned (i.e., the network controllers at the different domains unable to communicate with each other), the data plane of some embodiments may have connectivity (at least transiently) when the control plane does not. That is, the forwarding elements at the different domains may be able to send packets to each other despite the inability of the controllers to exchange state information. This is a result of the decoupled nature of the software-defined network control plane of some embodiments. In some embodiments, the data plane may even use an entirely different network and thus control plane connectivity or lack of connectivity provides little information about the data plane connectivity in general (i.e., the network controllers communicating on a first network while the managed forwarding elements (and therefore the VMs) communicate on a second, different network).

Thus, some embodiments enforce that data plane connectivity not be established between two physical domains prior to the reconciliation of the control planes and the local commitment of the reconciliation results on both domains (i.e., the sending and receiving sides of a packet flow). That is, in some embodiments the data plane at the receiving side will block the packets until it receives an acknowledgment from the sender side indicating that it is up to date. Similarly, in some embodiments, this blocking at the receiving side commences once control plane connectivity goes down. Without this requirement, the data planes could interact, and possibly cause packet leaks (resulting in policy violations) while the data plane connectivity is up but the control planes have not reconciled. That is, one of the physical domains might not be made aware of a change in policy at the control plane, and therefore allow a VM located in that physical domain to send packets that have been specifically disallowed by the attempted security policy.

In some embodiments, coupling the data and control planes enables the benefits of traditional distributed route computation. In such traditional distributed route computation, the planes are tightly coupled and only after routing protocol peering has been established is the corresponding interface enabled.

Figure 14A:
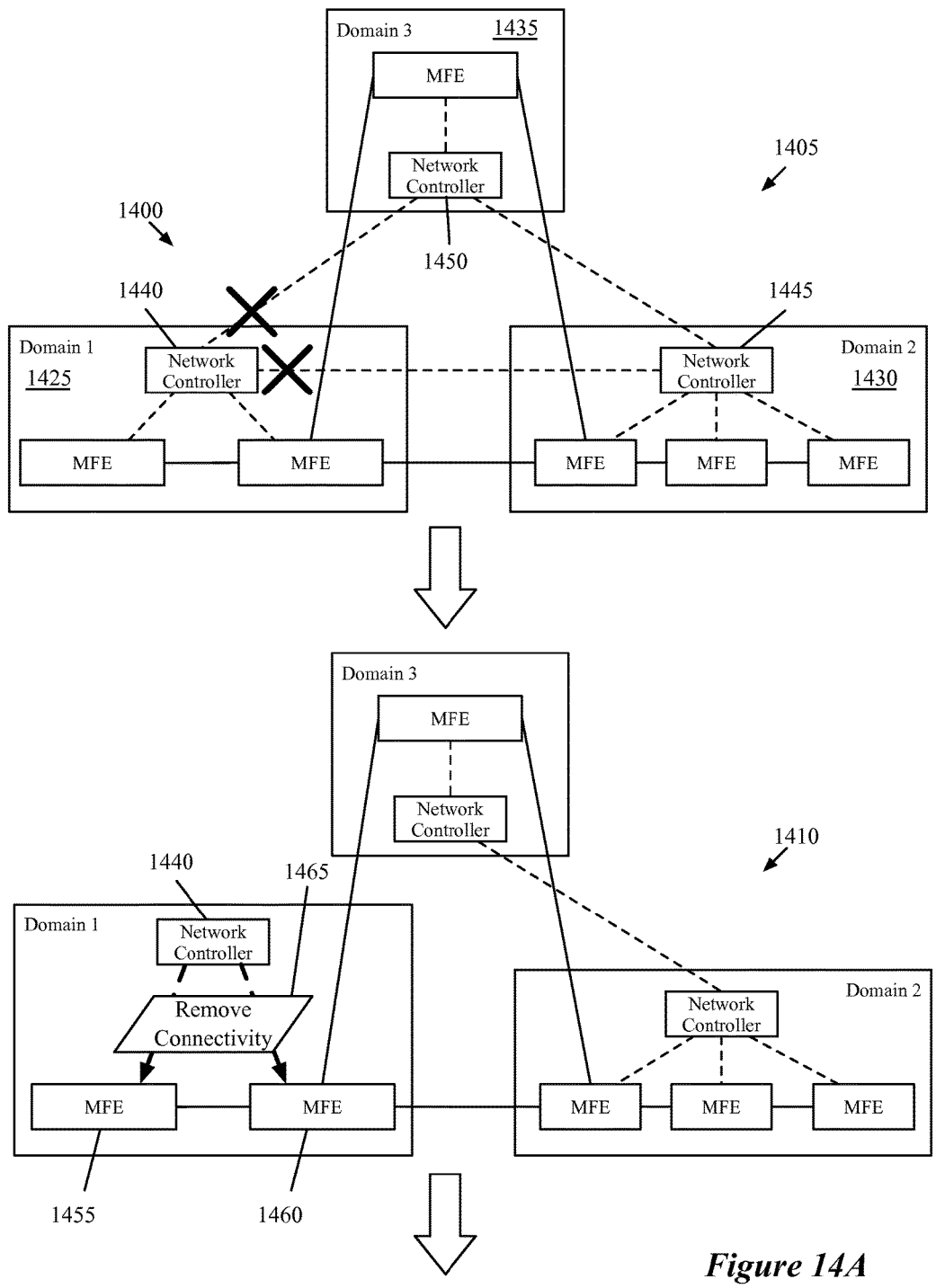
FIG. 14A-B conceptually illustrate the use of messages from a disconnected network controller to its local managed forwarding elements (MFEs0 in order to prevent the MFEs from receiving packets from domains with which the network controller has lost connectivity.
Figure 14B:
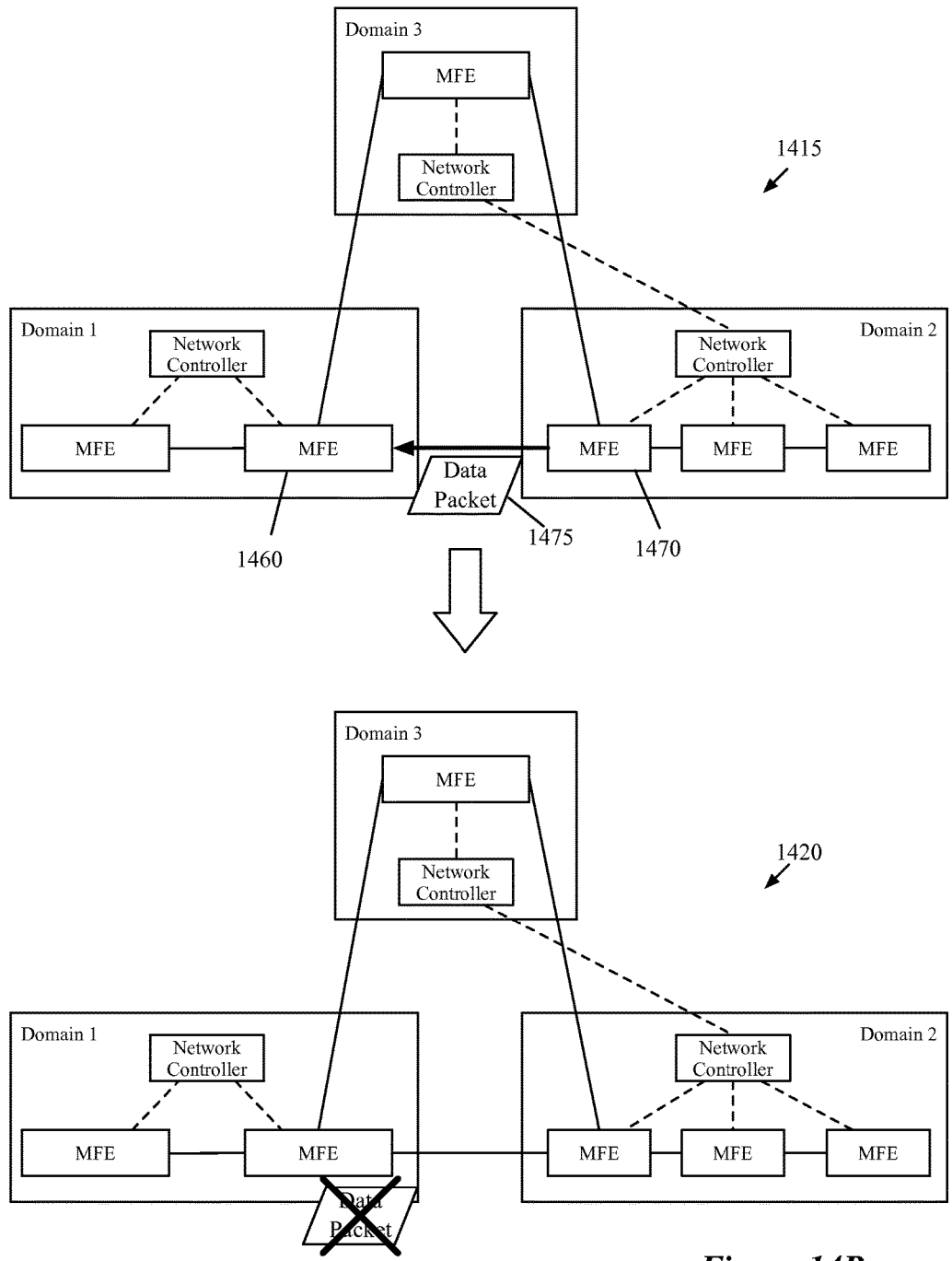

FIG. 14A-B conceptually illustrate, over four stages 1405-1420 of a network 1400, the use of messages from a disconnected network controller to its local MFEs in order to prevent the MFEs from receiving packets from domains with which the network controller has lost connectivity. The network 1400 includes three domains 1425-1435, with each domain having a network controller (or controller cluster). A first network controller 1440 resides in the first domain 1425, a second network controller 1445 resides in the second domain 1430, and a third network controller 1450 resides in the third domain 1435.

As shown in the first stage 1405, the network controller 1440 loses communications with the controllers 1445 and 1450 in the other domains. This could be due to a problem on the controller 1440 or an issue with the networking between the domains, including physical network failure, a configuration problem (e.g., incorrect firewall settings), or a different network problem leading to communication loss. However, the data paths between the MFEs (shown as solid lines rather than the dashed lines used for control paths) have maintained connection. This could occur because the data plane uses a separate physical network than the controllers, or because of a configuration error (e.g., in a firewall) that blocks control channel packets while allowing data traffic.

The second stage 1410 illustrates that, upon discovering the disconnection, the network controller 1440 sends messages 1465 to the MFEs 1455 and 1460 that it manages. In some embodiments, the network controller discovers that it is disconnected from other domains upon attempting to send state updates to those domains and failing to receive acknowledgement. Because the data connection could still be valid, the network controller 1440 sends the messages 1465 instructing the MFEs to drop packets sent from locations outside the domain. While these figures illustrate one of the MFEs at each domain acting as an interconnection point, in some embodiments the MFEs form a full mesh (e.g., of tunnels) across domains. In this case, all of the MFEs could receive packets directly from MFEs at the other domains, and therefore would need to receive the instruction to drop packets from these other domains. On the other hand, if the domains connect through the use of gateways, or extenders, then in some embodiments only these gateways need to receive the instructions to drop packets from other domains, as all packets from the other domains will be sent through the gateways.

In some embodiments, the connectivity removal messages 1465 specify a set of physical connections (e.g., a set of tunnels) from which the MFEs should not receive packets. As such, each MFE receives a customized message in some embodiments, as each MFE may have a different connection to the MFEs at other domains. In other embodiments, more intelligence is contained in the MFE, and the controller simply instructs the MFE to drop packets received from specific domains, at which point the MFE determines to which connections the message relates and begins to drop packets received through those connections.

In some embodiments, the network controllers 1445 and 1450, which have retained communication between themselves, also send messages to their respective MFEs, instructing their MFEs to drop traffic received from the domain 1425. If the network controllers on one side of the disconnect were to receive and process a state update that could not be sent to the controllers on the other side of the disconnect, then packets sent based on a newer state could be sent to MFEs that would process the packets based on an older state, or vice versa. In either case, this could result in packets being delivered contrary to policy, an unwanted scenario.

The third and fourth stages 1415 and 1420 illustrate the result of these messages 1465. With the data communication still active between the domains 1425 and 1430, a MFE 1470 from the domain 1430 forwards a data packet 1475 to the MFE 1460 located in the domain 1425 at the third stage 1415. This might be a data packet sent from a VM connected to the MFE 1470 to a destination that the MFE 1470 believes is connected to the MFE 1460 (which may or may not actually be located there at this point).

In the fourth stage 1420, the MFE 1460 drops the packet 1475. In some embodiments, the MFE begins processing the packet and identifies the port (e.g., the tunnel) through which the packet was received. Based on this port matching a rule generated by the connectivity removal message 1465, the MFE identifies the packet as one to be dropped, and does so, so that the packet does not reach its destination.

This section refers to several packets. The term "packet" is used here as well as throughout this application to refer to a collection of bits in a particular format sent across a network. One of ordinary skill in the art will recognize that the term packet may be used herein to refer to various formatted collections of bits that may be sent across a network, such as Ethernet frames, TCP segments, UDP datagrams, IP packets, etc.

Figure 15:
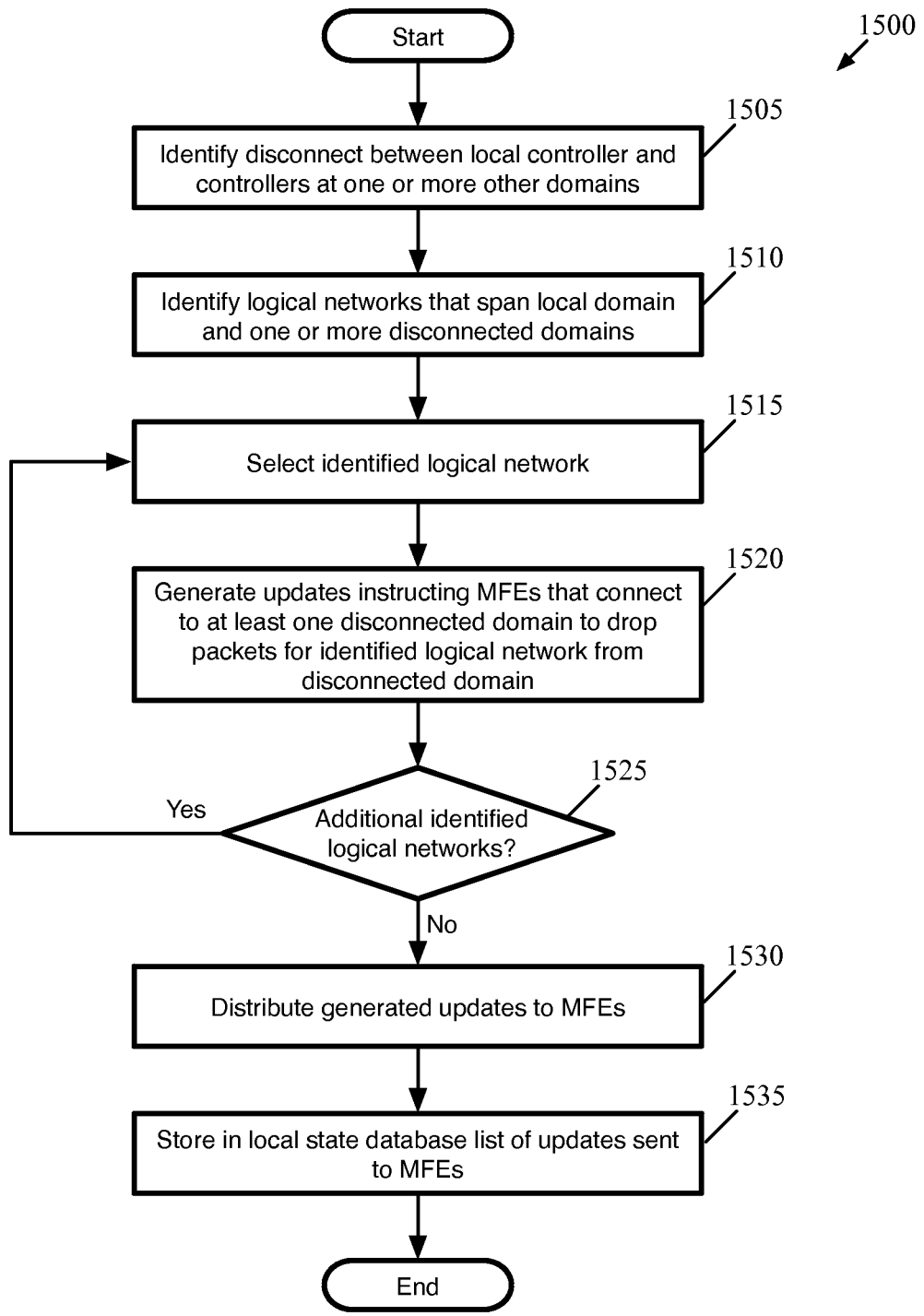
FIG. 15 conceptually illustrates a process for notifying MFEs at a local domain to end connectivity with MFEs at one or more external domains when network controller connectivity is unavailable between the domains.

FIG. 15 conceptually illustrates a process 1500 for notifying MFEs at a local domain to end connectivity with MFEs at one or more external domains when network controller connectivity is unavailable between the domains. In some embodiments, the process 1500 is performed by a controller in a domain when the controller has lost connectivity with controllers at other domains, in order to prevent the transmission of packets against local or global policy based on outdated state.

As shown, the process 1500 begins by identifying (at 1505) a disconnection between the local controller and controllers at one or more other domains. That is, the network controller identifies that it cannot communicate with the controllers located at least one other failure domain. The network controller identifies this disconnection when the other controller fails to acknowledges messages sent by the controller. For instance, in some embodiments, the controllers regularly (e.g., every 30 seconds, every minute, etc.) send out ping-type messages to the other controllers, in order to ensure that the connection is up. When these messages are not replied to, the controller identifies that the connection has gone down.

After the controller identifies this network partitioning, the process identifies (at 1510) the logical networks that span both the local domain and one or more of the disconnected domains. If a logical network spans only the local domain, or only the local domain and one or more other domains that all remain connected, then packets from that logical network can be trusted, as all state updates will be propagated to the local network controller. However, a logical network that spans both the local domain and a disconnected domain could have state updates at the disconnected domain which are not propagated to the local domain and would then result in packets being sent according to one policy and received according to another policy.

Once the affected logical networks are identified, the process 1500 selects (at 1515) one of the identified logical networks. The logical networks may be selected in any order (e.g., randomly, based on a numerical order according to a logical network identifier, etc.). The process then generates (at 1520) updates instructing the MFEs in the local domain that connect to at least one disconnected domain to drop packets for the identified logical network received from the disconnected domain. Which MFEs these will be depends on the interconnection between domains.

In some embodiments, all of the MFEs have connections (e.g., tunnels) to all of the MFEs at the other domains, because the network administrator will not know in advance which VMs will be located at which host machines, and VMs might migrate from one host to another. In other embodiments, the VM locations are more stable, and tunnels are only generated (i.e., tunneling information is only distributed to the MFEs) for connections that the controllers identify will be used (i.e., when two MFEs have VMs connected from the same logical network). In yet other embodiments, the domains only connect through gateways, in which case only the gateways need to receive the updates to drop packets from gateways at the disconnected domains.

The updates generated, in some embodiments, are messages identifying the packets for the MFE to drop if received. In some embodiments, these messages specify either the logical ports from which packets should be dropped, source addresses of packets to drop, etc. Some embodiments use messages that identify, for each MFE, the tunnels that connect to MFEs at the domains to which network controller communication has been lost, and specify to drop packets received via these tunnels.

The process then determines (at 1525) whether there are any additional logical networks identified as spanning both the local domain and a disconnected domain. If additional logical networks remain, the process returns to 1515 to select the next logical network. Otherwise, the process 1500 distributes (at 1530) the generated updates to the MFEs. In some embodiments, these are distributed in a manner similar to state updates, or could even be sent with additional state updates in a single transaction with the MFEs.

The process also stores (at 1530) in its local state storage a list of the updates sent to MFEs. Some embodiments store this information in the local state storage because the information does not need to be shared with network controllers at other domains, as it is a purely localized issue. However, storing the information allows the controller to easily determine the messages to send to its local MFEs upon reconnection with the other network controllers.

IV. Transactional Updates Across Domains

The previous section describes a technique of some embodiments to prevent the delivery of packets that could potentially violate intended policies. That is, a goal of coupling the control and data planes is to cause the data plane to drop any packets for which the sending and receiving failure domains disagree about the configuration version. A second technique used by some embodiments is to apply state updates transactionally with version identifiers applied. If two MFEs have different versions of the network state, then the receiving MFE will not be able to process a packet from the sending MFE, and will therefore drop the packet. Thus, any policy inconsistencies will result in disconnection.

The result of the reconciliation techniques described above in Section II is a single global master per logical network in some embodiments. Once the logical master has reconciled the state, and then committed the state by (i) setting up the new state and (ii) tearing down the old state, the data plane connectivity is established globally. The new state of some embodiments involves assigning a new version identifier (or peerwise label) for the new state, in order to guaranteed the atomicity of the state update.

In some embodiments, the transactional updates follow the same principles as transactional updates implemented by the controllers within a single failure domain, such as that described in International Patent Publication WO2013/

158917, entitled "Using Transactions to Compute and Propagate Network Forwarding State", which is incorporated herein by reference. To perform a transactional update, the central master publishes a sequence of updates to the managed forwarding elements in order to provide the forwarding elements with the new configuration with minimal data plane downtime.

Specifically, in some embodiments, the central master for the logical network generates the updates required to receive packets using the new configuration. The central master then sends these updates to the controllers at all of the failure domains that implement the logical network. The logical controllers at the other failure domains then independently publish the updates to their managed forwarding elements transactionally. In some embodiments, these controllers publish the updates as part of other updates pushed down to the forwarding elements.

Once the network control system has sent the instructions to receive packets with the new configuration, the network control system then sends updates to send packets with the new configuration in some embodiments. As with the receiving updates, the central master generates the required updates and sends these updates to the controllers at the different failure domains. These then independently send the updates to the managed forwarding elements. Again, in some embodiments, the updates for sending packets are sent as part of other updates pushed down to the forwarding elements. Once individual managed forwarding elements receive the packet sending updates, these forwarding elements begin using the new configuration and marking sent packets with a version identifier. As the managed forwarding elements receive the packets, these forwarding elements use the receiving instructions for the new configurations.

In some embodiments, the global master then issues a transaction to remove the old sending and receiving instructions. As with the updates to implement the new configuration, these instructions are first sent from the global master to the controllers at the individual failure domains, then from these controllers to the managed forwarding elements.

Figure 16A:
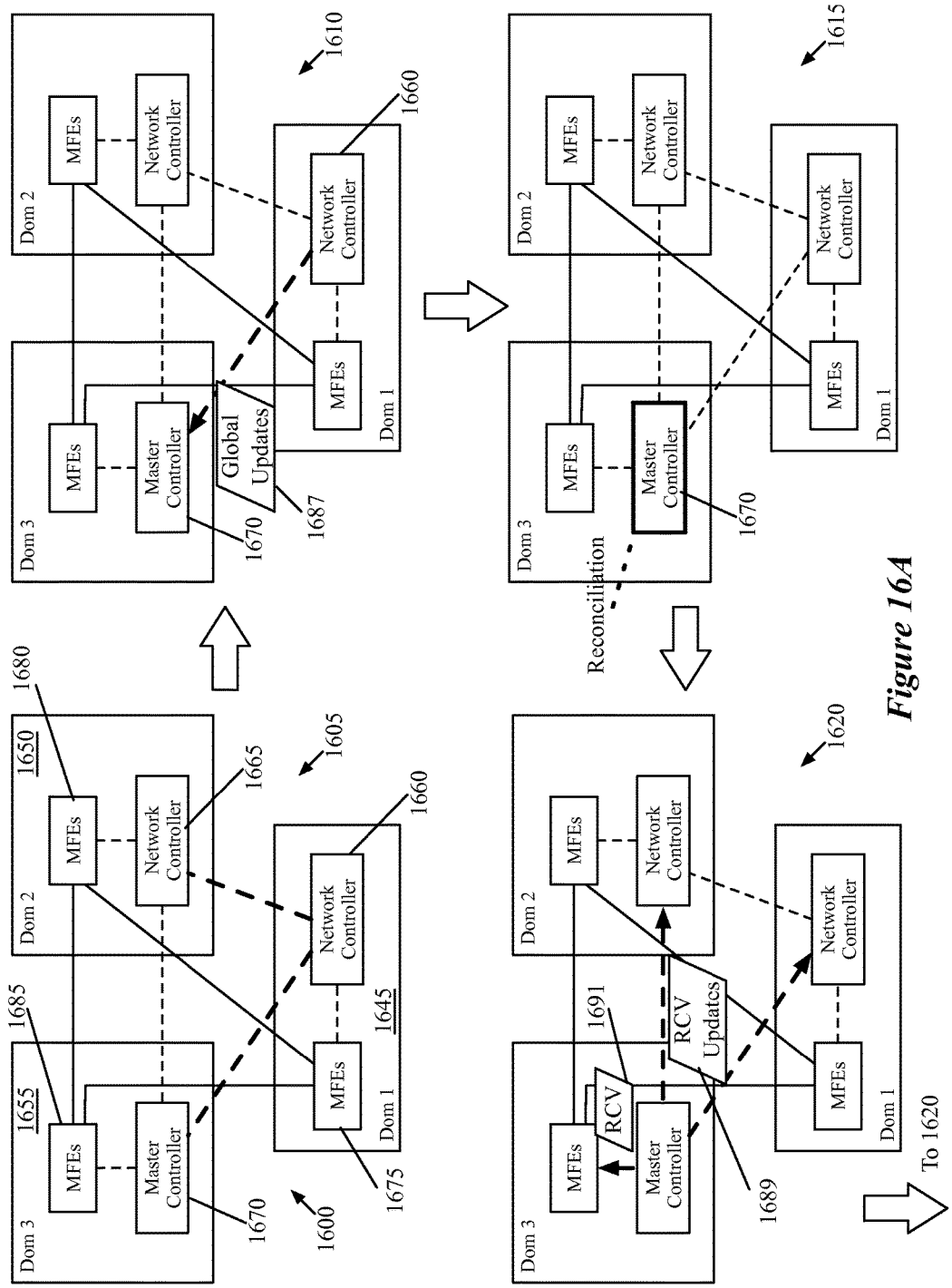
FIGS. 16A-B conceptually illustrate the publication of transactional updates across domains.
Figure 16B:
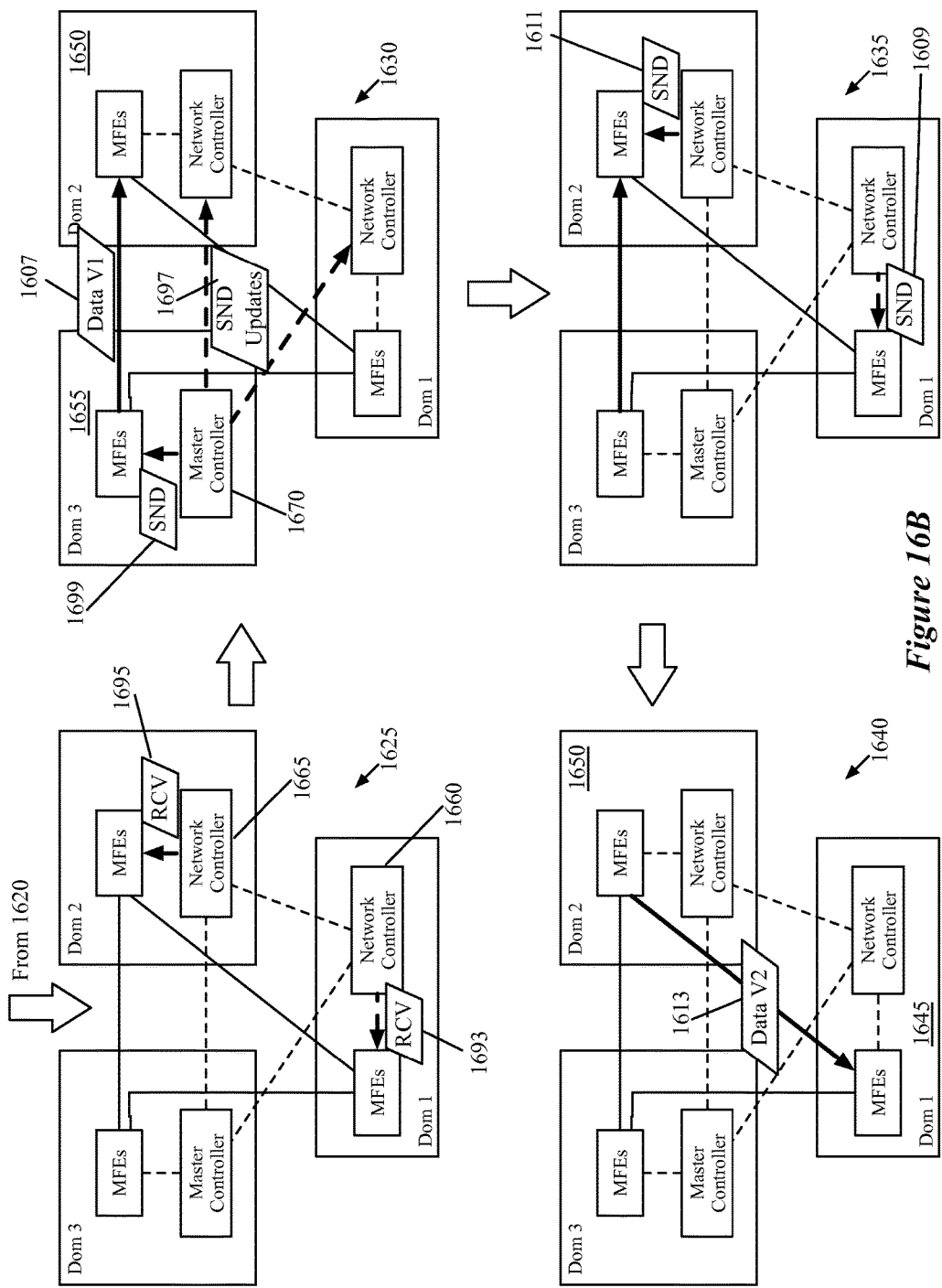

FIGS. 16A-B conceptually illustrate the publication of transactional updates across domains over eight stages 1605-1640 of a network 1600. The network 1600 includes three domains 1645-1655, each of which includes at least one network controller 1660-1670. While more than one logical network may be implemented across these domains, FIGS. 16A-B relate to the updates for a single logical network for which the network controller 1670 located at the third domain 1655 is the master for reconciliation purposes. For other logical networks implemented by these three domains, or a subset thereof, different network controllers may be elected the master (e.g., using a consensus protocol, as described above). The network 1600 also includes managed forwarding elements located at each of the domains, which receive state (e.g., flow entries, configuration state, etc.) from their local network controllers. The MFEs 1675-1685 are shown as a single box in each domain in the figure for illustration purposes, but one of ordinary skill in the art will recognize that each domain is likely to include multiple MFEs that implement the logical network.

The first stage 1605 illustrates, via the bolded dashed lines, that the network controller 1660 at the first domain 1645 has recently reconnected to the network controllers 1665 and 1670 at the other two domains after a period of disconnect. During this period, the network controller 1660 was unable to perform any state-sharing operations with the controllers at the other domains, and thus its MFEs 1675 may potentially be operating using a different version of the network state than the MFEs 1680 and 1685 at the other domains. In some embodiments, the network controllers provide version numbers to the MFEs with each state update for a logical network, and the MFEs attach this version number to packets sent for the logical network as part of the logical context appended to the packet (e.g., as part of the packet encapsulation). Thus, if one or both of the sets of disconnected controllers has updated its state, then logical network packets will be sent with a new version number. As such, if these packets are sent across the disconnect (because the data plane remains connected while the controllers are unable to communicate), then they will be received by an MFE operating using a different version of the state, which will therefore drop the packets.

During the disconnection period, any globally-relevant (i.e., non-local) state changes made at the network controller 1660 will be place in a queue for eventual distribution to the master controller 1670. As shown, upon reconnection, the network controller 1660 sends a set of global updates 1687 to the master controller 1670 for the logical network. Each of the global updates, in some embodiments, is related to the particular logical network for which the controller 1670 is the master (though, in a network with numerous logical networks implemented, the controller 1670 may be the master for several logical networks).

In the third stage 1670, the master controller 1670 performs its reconciliation operations (e.g., the process 1300 described above) in order to resolve any conflicts in state between its stored state and the updates from the network controller 1660. The reconciliation of some embodiments involves both determining which is the correct network state to use among conflicting data, but also performing any computations necessary based on the selected state (e.g., generating new flow entries for directing its local MFEs).

After performing the conflict resolution, in the fourth stage 1620 the master controller 1670 sends updates 1689 to the other network controllers 1660 and 1665. The initial updates provide the network state required for MFEs that implement the logical network to receive packets, but not the state required to send packets. In some embodiments, the controllers initially propagate the packet-receiving state so that the MFEs will be prepared to receive packets according to the most up-to-date network state before any of the MFEs begin sending packets using the new network state.

These updates may actually be different for each of the two controllers in some embodiments. In some embodiments, the master controller only sends the change in network state to the other controllers rather than sending the much larger transaction of the entire state. As such, this delta will be different for the two controllers 1660 and 1665, because their initial state will be different after the disconnect period. Thus, the conflicts resolved in favor of the state updates 1687 provided by the network controller 1660 will not be sent to that controller, whereas state changes previously made at the master controller will not be sent to the controller 1665, because it will have already received these updates as part of the normal processing.

In addition to distributing the packet-receiving updates 1689 to the other network controllers 1660 and 1665, the master controller 1670 sends packet-receiving updates 1691 to its local MFEs that implement the logical network. In some embodiments, the state updates 1691 are computed by the master controller 1670 based on the changes in network state. For instance, in some embodiments the state updates 1691 contain flow entries that direct the forwarding of the MFEs 1685. The packet-receiving updates 1689 sent to the network controllers 1660 and 1665, on the other hand, are the configuration (input) state, and the task of computing state for distribution to the MFEs is left to those controllers. In other embodiments, however, the master controller performs the state computation and distributes the updates to the network controllers at other domains (possibly excepting any local MFE customization performed by these other network controllers).

The fifth stage 1625 illustrates that the network controllers 1660 and 1665 propagate updates 1693 and 1695, respectively, to their local MFEs. As indicated, in some embodiments, the network controllers 1660 and 1665 receive the updates 1689 from the master controller, then perform their own state computation in order to generate the updates 1693 and 1695 pushed down to the MFEs. In other embodiments, however, the network controllers simply propagate the received packet-receiving updates to the MFEs, possibly adding customization information to the updates (i.e., customization relating to the particular MFEs to which the state updates are sent).

After the packet-receiving updates have been sent, in the sixth stage 1630 the master controller 1670 transmits the packet-sending updates 1697 to the network controllers 1660 and 1665. As with the packet-receiving updates 1689, these updates may actually be different for each of the two controllers in some embodiments, because their initial state will be different after the disconnect period. In addition to distributing the packet-sending updates 1697 to the other network controllers 1660 and 1665, the master controller 1670 sends packet-sending updates 1699 to its local MFEs that implement the logical network. In some embodiments, the state updates 1699 are computed by the master controller 1670 based on the changes in network state, as described above for the packet-receiving updates. The packet-sending updates 1697 sent to the network controllers 1660 and 1665, on the other hand, are the configuration (input) state, and the task of computing state for distribution to the MFEs is left to those controllers. In other embodiments, however, the master controller performs the state computation and distributes the updates to the network controllers at other domains (possibly excepting any local MFE customization performed by these other network controllers).

In addition to these updates, the sixth stage 1630 also shows a data packet 1607 sent from an MFE in the third domain 1655 to an MFE in the second domain 1650. At this stage, the MFEs have not yet received the packet-sending updates, so the data packet 1607 carries a state version number indicating the previously-used network state. This version number does not correspond to the packet-receiving state recently received by the MFE in the second domain 1650. However, in some embodiments the MFEs do not immediately remove the earlier version of the network state, and can process packets with either state version. Thus, the data packet 1607 can be delivered to its destination. On the other hand, sending a packet to one of the MFEs at the first domain 1645 would likely result in a packet drop, because the MFEs at this domain would not have the network state version attached to the packet (unless the network state was not changed during the network partitioning).

The seventh stage 1635 illustrates that the network controllers 1660 and 1665 propagate updates 1609 and 1611, respectively, to their local MFEs. As indicated, in some embodiments, the network controllers 1660 and 1665 receive the updates 1697 from the master controller, then perform their own state computation in order to generate the updates 1609 and 1611 pushed down to the MFEs. In other embodiments, however, the network controllers simply propagate the received packet-sending updates to the MFEs, possibly adding customization information to the updates (i.e., customization relating to the particular MFEs to which the state updates are sent).

Finally, as shown in the eighth stage 1640, one of the MFEs at the second domain 1650 sends a data packet 1613 to an MFE at the first domain 1645, using the updated network state version. As the MFEs in the first domain 1645 already received the packet-receiving updates 1693 in the fifth stage 1625, the MFE is able to process and receive the packet. In some embodiments, once both the packet-receiving and packet-sending updates have been propagated to all domains, the master controller sends out a command instructing the MFEs to remove the previous version of the state, which is also propagated through the network controllers at the different domains.

Figure 17:
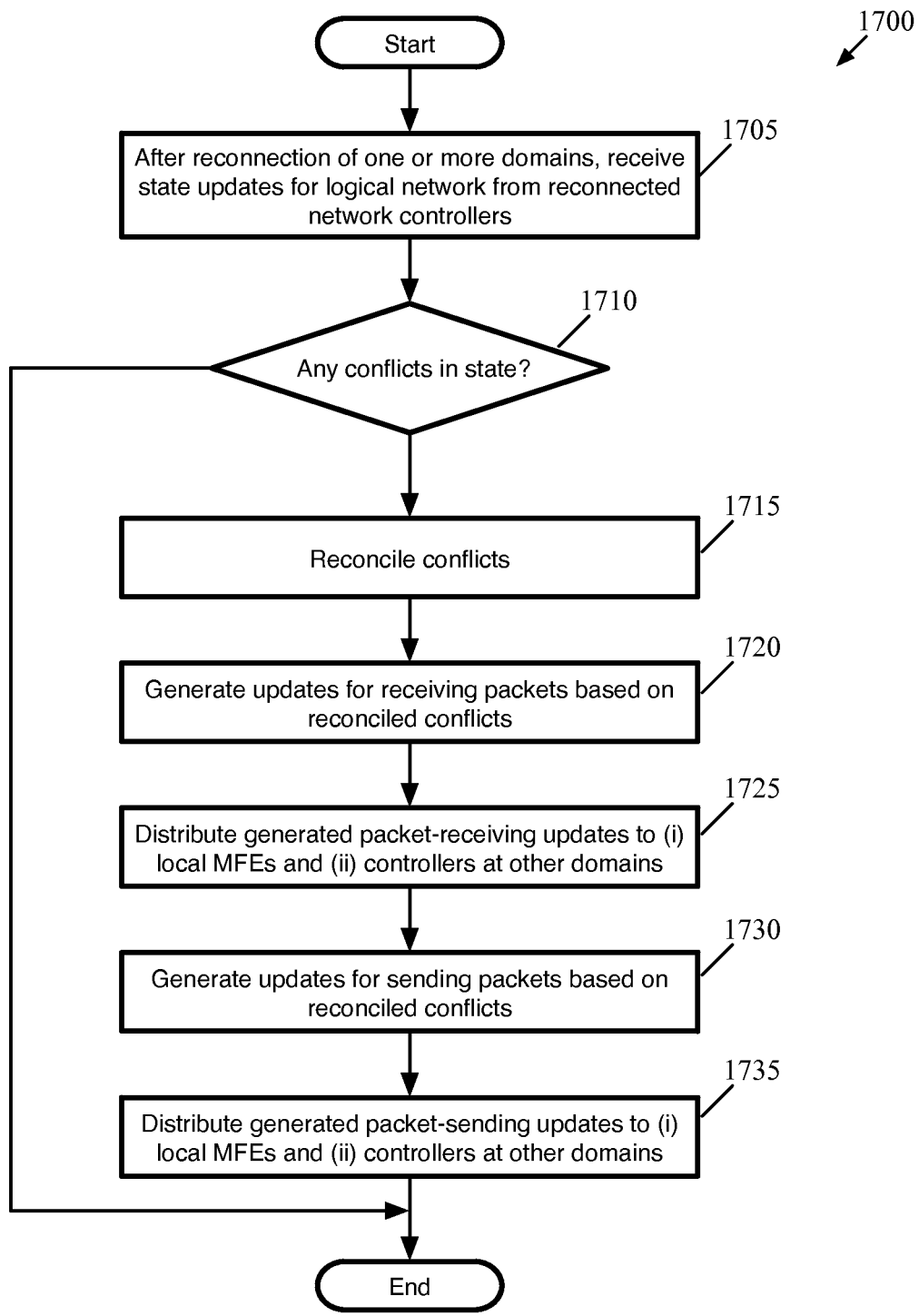
FIG. 17 conceptually illustrates a process performed by the master controller of some embodiments to distribute transactional updates after all domains have been reconnected.

FIG. 17 conceptually illustrates a process 1700 performed by the master controller of some embodiments to distribute such transactional updates after all domains have been reconnected. As shown, the process 1700 begins by receiving (at 1705), after reconnection of the network controllers of one or more domains, state updates for a particular logical network from reconnected network controllers. In this case, the controller performing the process 1700 is the master controller for the particular logical network, and therefore receives the state updates upon reconnection.

The process then determines (at 1710) whether there are any conflicts in the state based on the received state updates. If the network state has not changed at either the master domain (and any domains that remained connected to the master domain) or at the disconnected domains, or if the state changes were exactly the same (e.g., the same security policies were changed in the same manner at each domain), then no conflicts will be present and the process ends because no state updates are needed.

On the other hand, assuming that the controllers at different domains are storing different state for the logical network, the process 1700 reconciles (at 1715) these conflicts to determine the correct state to use. As described above, this may involve using the update with a more recent timestamp for certain types of state, or using other techniques to select one of the conflicting version of the state for other types of state (e.g., favoring stricter security policies).

With the state reconciled, the process 1700 generates (at 1720) updates for receiving packets based on the reconciled conflicts. The process then distributes (at 1725) the generated packet-receiving updates to (i) the local MFEs at the domain of the master controller and (ii) the network controllers at other domains. As described by reference to FIG. 16, in some embodiments the generated updates reflect only the changes to the network state, and therefore may be different for different controllers. Furthermore, some embodiments provide computed state to the local MFEs and configuration state to the non-master controllers, allowing these controllers to then compute the state to distribute to their own MFEs.

After generating and distributing the packet-receiving updates, the process 1700 generates (at 1730) updates for sending packets based on the reconciled conflicts. The process then distributes (at 1735) the generated packet-sending updates to (i) the local MFEs at the domain of the master controller and (ii) the network controllers at other domains. As with the packet-receiving updates, in some embodiments the generated updates reflect only the changes to the network state for each controller. In addition, as with the packet-receiving updates, in some embodiments the master controller provides computed packet-sending state to the local MFEs and configuration packet-sending state to the non-master controllers. The process then ends, although in some embodiments the master controller issues additional commands instructing the MFEs to remove the previous version of the network state, and distributes these commands through the other controllers as well.

Figure 18:
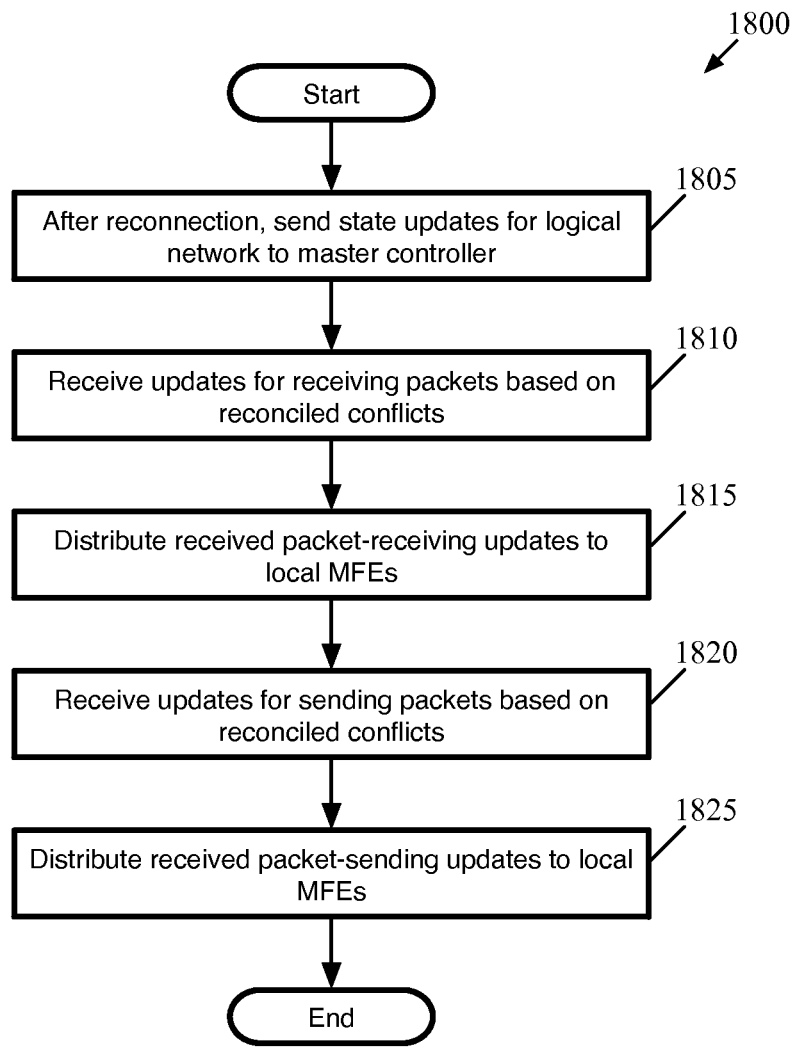
FIG. 18 conceptually illustrates a process of some embodiments for distributing such transactional updates by a non-master controller.

While the process 1700 describes the actions of the master controller for a logical network, FIG. 18 conceptually illustrates a process 1800 of some embodiments for distributing such transactional updates by a non-master controller. As shown, the process 1800 begins by sending (at 1805) state updates for a logical network to the master controller for the logical network after reconnection of the controller performing the process 1800 to the master controller. In this case, the controller performing the process 1800 has been disconnected from the master controller and had at least one state update queued during that time.

After the master controller performs the reconciliation process described above in order to determine the conflict-free network state for the logical network, the process 1800 receives (at 1810) updates for receiving packets based on the reconciled conflicts. The process then distributes (at 1815) these packet-receiving updates to the local MFEs managed by the network controller that implement the particular logical network. In some embodiments, the network controller receives the packet-receiving updates as input state, and computes output state to distribute to the MFEs.

The process 1800 subsequently receives (at 1820) updates for sending packets based on the reconciled conflicts. The process then distributes (at 1825) these packet-sending updates to the local MFEs managed by the network controller that implement the particular logical network. In some embodiments, as with the packet-receiving updates, the network controller receives the packet-sending updates as input state, and computes output state to distribute to its MFEs. The process 1800 then ends.

V. Allocation of Context Identifiers

As described above, some embodiments treat the assignment of new context identifiers (for new logical networks, logical forwarding elements, logical ports, etc.) as non-reconcilable global state and therefore not writeable during periods of disconnection. However, doing so hampers the ability of the network administrator to make desired local changes, because context identifiers might be used in the local domain that also get assigned in a disconnected domain. After reconnection, the use of the same context identifier for two different entities could result in serious policy violations. Thus, some embodiments ensure that the packet context identifiers are globally unique across all domains.

In order to allow the assignment of context identifiers during times that domains are disconnected, some embodiments distribute to each domain a number of unique identifiers for the domain to use in case of disconnection. That is, in order to guarantee operations in the presence of disconnections from other domains, in some embodiments each failure domain pre-allocates context identifiers for its local operations. As such, if a particular failure domain is disconnected from the rest of the network, it has a pre-allocated pool of identifiers for use while maintaining local operations. Similarly, if disconnected, the controllers within a failure domain do not release the identifiers before partitioning is over in some embodiments. Along these lines, none of the domains outside the failure domain will repurpose the identifiers of the disconnected domain. The pre-allocation of some embodiments requires a sufficient number of identifiers. The more identifiers that are available, the more identifiers may be pre-allocated, and therefore longer periods of disconnection can be sustained.

Some embodiments use a master controller for each logical network for the purpose of assigning identifiers. In some such embodiments, this master controller may be the same as the master controller for handling reconciliation, managing state updates, etc. In some embodiments, the master controller stores a set of globally available identifiers for use when the domains are connected, as well as a set of identifiers that are in use. The master controller allocates identifiers for use during disconnection to the controllers at the other domains, and marks these identifiers as in use. In addition, because context identifiers should not be re-used across logical networks in some scenarios, some embodiments designate the controller at one failure domain a "master of masters" for the purpose of context identifier assignment. In some embodiments, this controller assigns globally available identifiers to the different logical masters.

Figure 19:
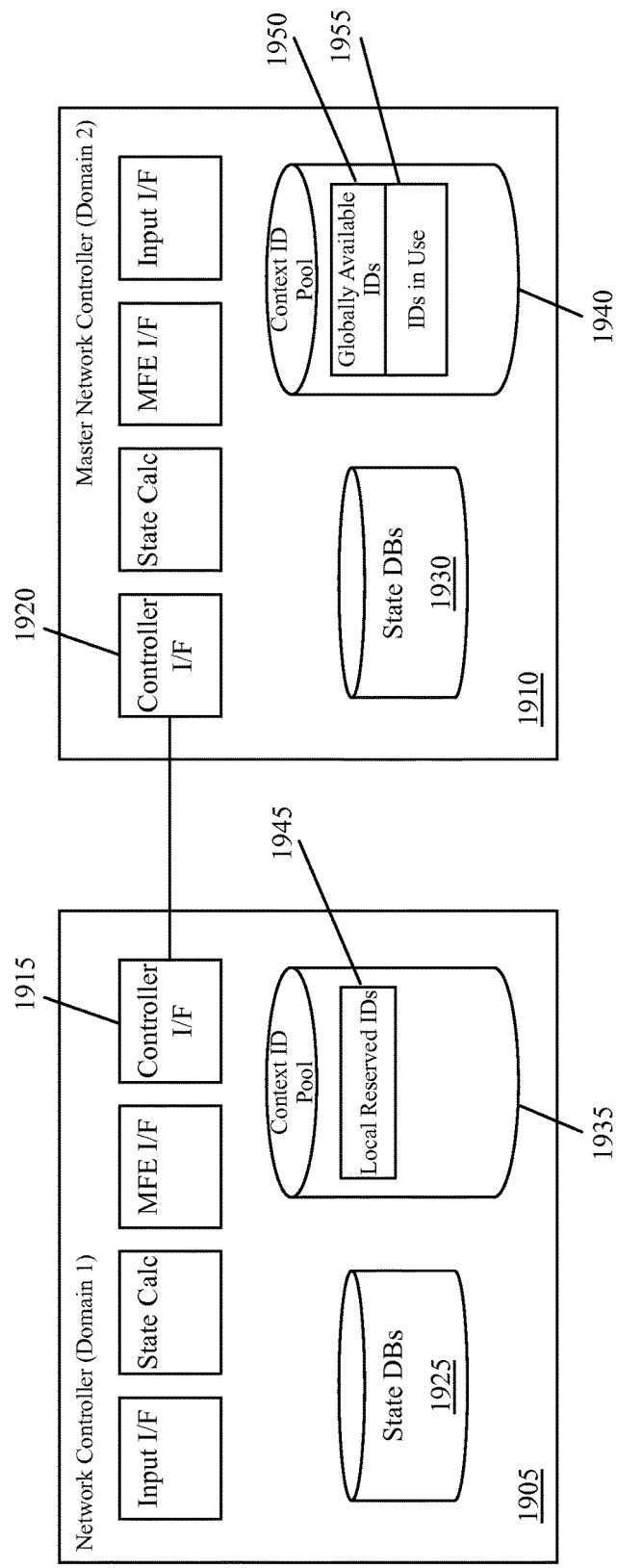
FIG. 19 conceptually illustrates two currently-connected network controllers operating in two domains.

FIG. 19 conceptually illustrates two currently-connected network controllers 1905 and 1910 operating in two domains to manage a logical network distributed across the two domains. The network controllers 1905 and 1910 each include an input interface, state computation module, MFE interface, and controller interface. As shown, the controller interface 1915 of the first network controller 1905 is currently connected to the controller interface 1920 of the second network controller 1910. The second network controller 1910 is the master of the particular logical network distributed across the domains. Each of the network controllers 1905 and 1910 stores a state storage 1925 and 1930, respectively. These state storage, though shown as a single database, may in fact be multiple storages with different properties, as described above in Section I (e.g., with different storages for local state, non-reconcilable global state, and reconcilable global state).

In addition, the network controller 1905 includes a pool 1935 of context identifiers, and the network controller 1910 includes a similar pool 1940 of context identifiers. In some embodiments, this pool is stored within the state storage (e.g., within one of the global state storages), though in other embodiments the context identifier pool is stored separately, as shown in this figure.

The context identifier pool 1940 of the master controller 1910 has two sections 1950 and 1955. The first section 1950 includes globally available identifiers. These globally available identifiers, in some embodiments, are identifiers that are not currently in use, and are available for requests for context identifiers received at controllers at all domains, so long as the controllers are connected. Thus, if a new entity is created at the first controller 1910, then the controller 1910 will assign one of these globally available identifiers to the new entity, and share this assignment with the other controllers (e.g., the controller 1905 at the second domain).

The pool 1940 also includes a set of identifiers 1955 that are in use. When the controller 1910 assigns one of the globally available identifiers 1950 to an entity, the controller stores that the identifier is in use (e.g., using a flag bit or other technique to mark the identifier as in use), and therefore will not assign the marked identifier to any other logical context.

The context identifier pool 1935 at the first network controller 1905 stores a set of local reserved identifiers 1945. These locally-reserved identifiers are not currently in use, but have been reserved to the network controller 1905 at the first domain (and to any other controllers potentially also operating in the domain). In some embodiments, the locally-reserved identifiers are only used when the controller becomes disconnected and will not be able to send state input requiring the assignment of context identifiers to the master network controller for assignment from the globally available identifiers 1950.

In some embodiments, the local reserved identifiers 1945 stored at the network controller 1905 are part of the in-use identifiers 1955 stored at the master controller 1910. That is, while these may not actually be in use, the master network controller treats them as such for the purposes of its identifier assignment. Thus, when the network controller 1905 is disconnected, it can assign identifiers locally from this set 1945 without any concerns of overlapping identifier assignment during the period of disconnection.

Similarly, when there are more than two domains across which a logical network is implemented, one of the network controllers (the elected master) stores the globally available identifiers and keeps track of which identifiers are in use, while controllers at each of the other domains store their locally reserved identifiers and use these to assign context identifiers when disconnected from the master. In addition, as mentioned, in the (typical) situation in which numerous logical networks are implemented across numerous domains, a single top-level master controller may be elected which handles the assignment of context identifiers across logical networks. Each of the logical network masters may request context identifiers for use with its logical networks, and these are treated by the top-level master as in use once assigned to a logical network master. The logical network master then uses its assigned context identifiers to (i) assign identifiers to entities and (ii) distribute reserved identifiers to controllers at the other domains for the logical network.

Figure 20:
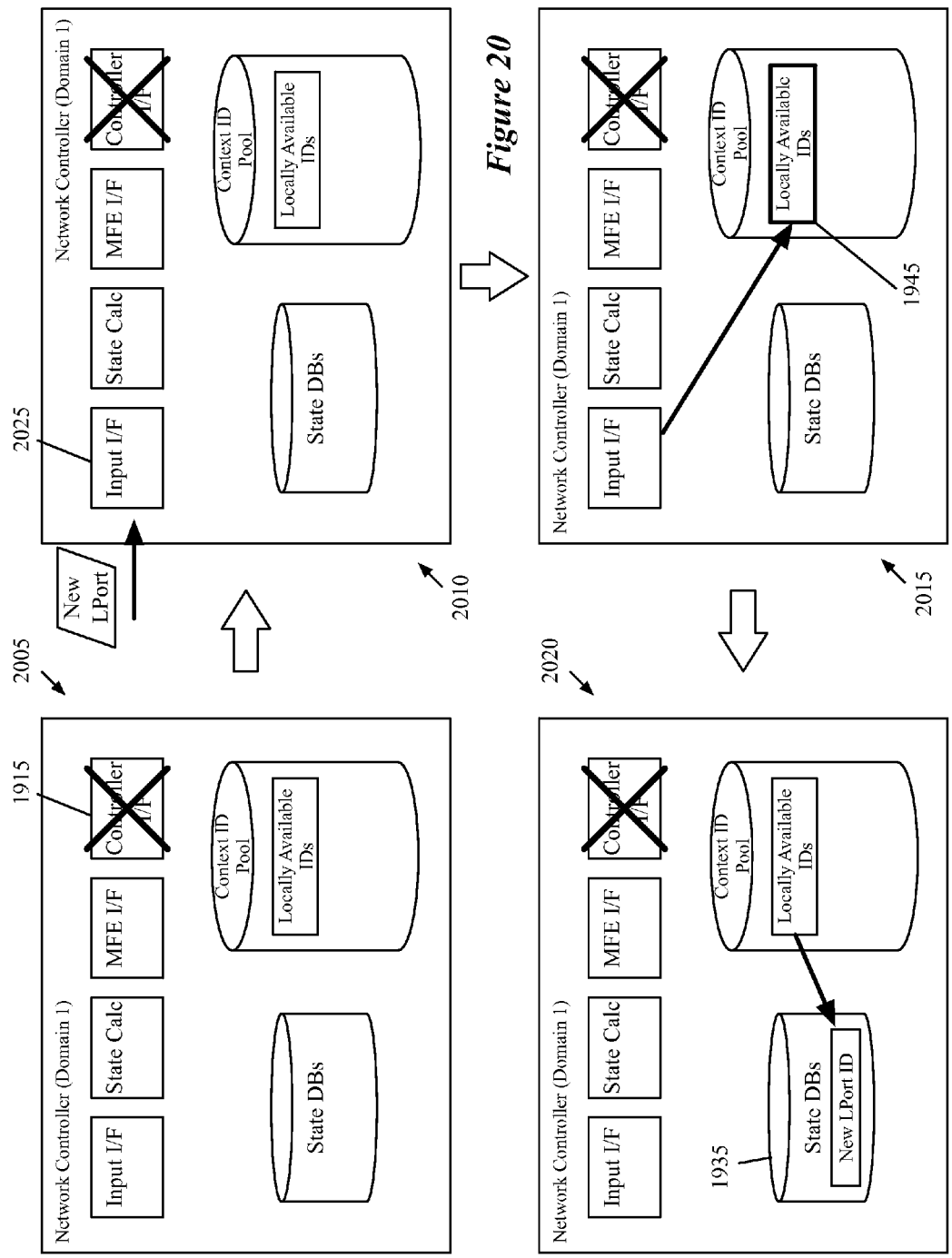
FIG. 20 conceptually illustrates a network controller as the controller assigns an identifier for a new logical port using one of its locally-reserved identifiers.

FIG. 20 conceptually illustrates the network controller 1905 over four stages 2000-2020 as the controller assigns an identifier for a new logical port using one of its locally-reserved identifiers. As shown, in the first stage 2005, the network controller 1905 loses communication with the master network controller 1910, indicated by the crossed-out controller interface 1915.

The second stage 2010 illustrates that the network controller 1905 receives input to create a new logical port, for the particular logical network for which the network controller 1910 is the master, and which spans these two domains, through its input interface 2025. In some embodiments, this input is received through an API based on user (e.g., network administrator) action.

At this juncture, if the network controller 1905 had communication with the master network controller 1910, the input to create a new logical port for this logical network would be forwarded through the controller interface 1915 to the master controller 1910 for the assignment of a port identifier. However, because the controllers have lost communication, in the third stage 2015 the input interface 2025 selects one of the locally-available identifiers 1945 for assignment to the new logical port, and in the fourth stage 2020 this new logical port is stored in the state storage 1925. The master controller is already treating this selected identifier as in use, and therefore will not assign the identifier to a different logical context during the period of disconnection.

Figure 21:
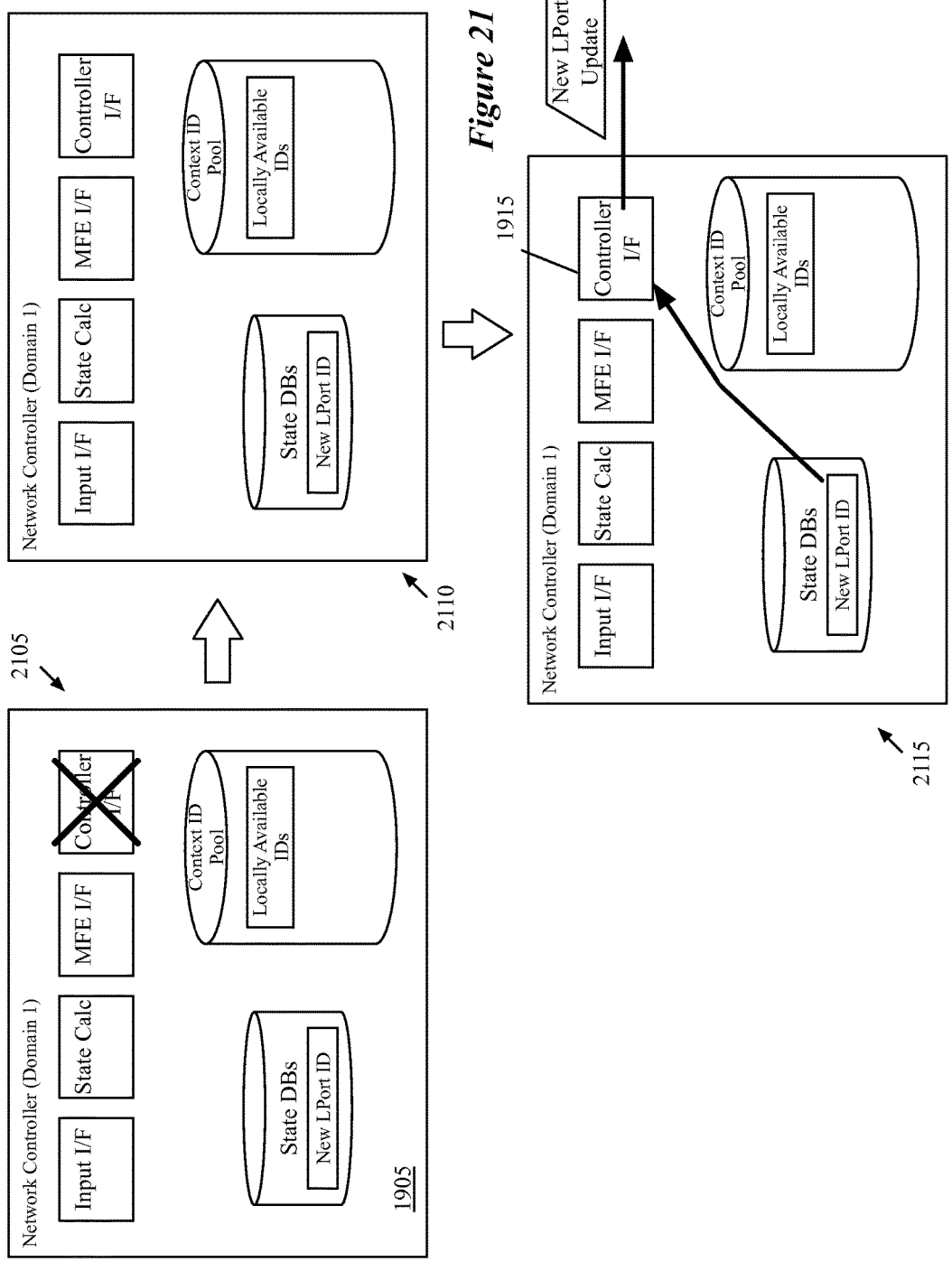
FIG. 21 conceptually illustrates the behavior of the network controller of FIG. 20 after reconnection to other domains.

FIG. 21 conceptually illustrates the behavior of the network controller 1905 after reconnection to other domains (e.g., to controller 1910) over three stages 2105-2115. In the first stage 2105, the network controller remains disconnected, in the same state as the final stage 2005 of FIG. 20. One of the locally-available context identifiers has been assigned to a new logical port for the particular logical network, as shown in the previous figure.

The second stage 2110 illustrates that the network controller 1905 has regained connection with the controllers at other domains, including the network controller 1910. This could be due to the physical network between the controllers being repaired, firewall settings being fixed, etc. As a result, in the third stage 2115 the network controller 1905 sends a state update to the master controller 1910 indicating the new logical port, which would include the context identifier assigned to the logical port. In some embodiments, this is a queued state update such as that described above in Sections I and II. While the report does not cause the master controller to modify the status of the context identifier, having already marked the identifier as in use when the identifier was allocated to the network controller 1905, it does allow the master controller to perform any state reconciliation required, and at least update its stored network state. Thus, if the context identifier assignment relates to purely local state, then the other controllers need not be made aware.

In addition, in some embodiments, the network controller may release some or all of its unused locally-reserved identifiers after reconnecting, so that these can be re-integrated into the global pool of identifiers by the master controller, or assigned to a different domain. In other embodiments, the controller maintains control over these reserved identifiers in case of later disconnect. The size of the pool of identifiers as well as the number of domains will determine the size of the pool of locally-reserved identifiers (e.g., as a particular percentage of the overall number of identifiers, split among the domains), because only so many of the identifiers can be reserved for single domains. The larger percentage that are reserved for local domains, the less flexibility the system will have in assigning identifiers from different domains. However, a system with larger numbers of reserved identifiers will be able to sustain longer periods of disconnect.

Figure 22:
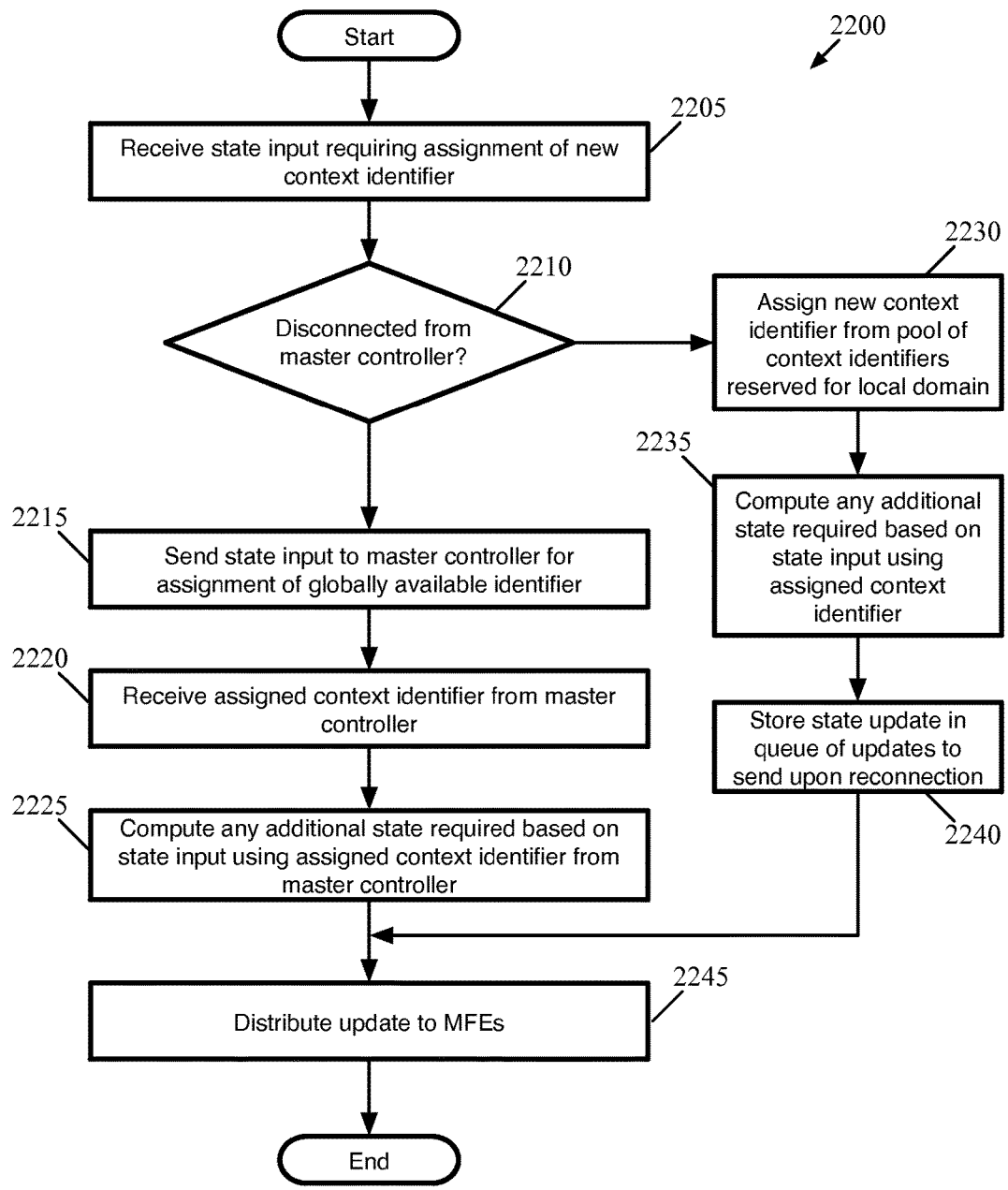
FIG. 22 conceptually illustrates a process of some embodiments for assigning a new context identifier upon receiving new state input.

FIG. 22 conceptually illustrates a process 2200 of some embodiments for assigning a new context identifier upon receiving new state input. In some embodiments, the process 2200 is performed by a network controller in a first physical domain that connects to network controllers at other physical domains, with logical networks potentially implemented across both the first domain and the other domains. In addition, in this case, the network controller performing the operations is a non-master controller for a particular logical network.

As shown, the process 2200 begins by receiving (at 2205) state input relating to a particular logical network that requires the assignment of a new context identifier at a particular controller. This could be the creation of a new logical forwarding element, a new logical port for an existing forwarding element, or any other input that requires a new identifier which could be stored in packets when sent between MFEs. In some embodiments, the logical context identifiers are not used by the VMs when sending packets, but are placed on packets by the MFEs and used by other MFEs to process the packets.

The process 2200 then determines (at 2210) whether the controller (at the first physical domain, performing the process 2200) is currently disconnected from controllers located at other physical domains. Some embodiments will have identified this disconnect because regular messages sent to the other controllers (e.g., ping or keep-alive messages) have not been returned as acknowledged.

When the controller at the first domain is connected to the controllers at all of the other physical domains, the process 2200 sends (at 2215) the input state (i.e., configuration input) to the master controller for the logical network to which the state relates. That is, the controller performing the process 2200 recognizes that the state relates to the particular logical network, and therefore that the master controller should perform the context identifier assignment (and any related state computation in some embodiments).

Thus, the process next receives (at 2220) an assigned context identifier from the master controller. As indicated, in some embodiments the master controller for the logical network assigns the context identifier from its pool of available identifiers for the logical network. Because the master controller treats the identifiers reserved to the non-master controllers as already assigned, the context identifier assigned by the master will not be one of these locally-reserved identifiers.

Having received the assigned context identifier, the process 2200 computes (at 2225) any additional state required based on the state input using the assigned context identifier. For example, if the new state is the creation of a logical port, then the controller calculates related updates to propagate to the MFEs in its local domain. If the MFEs use flow entries, then the controller calculates the flow entries relating to forwarding packets sent to and from the logical port (i.e., the VM associated with the logical port). In some embodiments, the controller sends this computed update to the master controller, while in other embodiments the master controller separately computes the update using the input state and the identifier it assigns. In some embodiments, in fact, the state update is instead calculated by the master controller and distributed to the controller performing the process 2200.

If, on the other hand, if the network controller at the first domain is disconnected, then the process 2200 assigns (at 2230) a new context identifier to the newly created entity from its pool of locally-available identifiers. These identifiers, as described above, are already treated as in use by master controller, and therefore will not be separately assigned before the controller at the first domain can notify them of the identifier usage.

The process 2200 then computes (at 2235) any additional state required based on the state input using the assigned context identifier. For example, if the new state is the creation of a logical port, then the controller calculates related updates to propagate to the MFEs in its local domain. If the MFEs use flow entries, then the controller calculates the flow entries relating to forwarding packets sent to and from the logical port (i.e., the VM associated with the logical port).

In addition, the process stores (at 2240) a state update relating to the new state information in a queue of state updates to send to the master controller upon reconnection (i.e., the state update queue described by reference to FIGS. 8-10. As mentioned above, this stored state update will, by its nature, indicate the assignment of the context identifier, although the master controller will have already noted the context identifier as in use.

Finally, the process 2200 distributes (at 2245) the updates relating to the new state to the MFEs. These updates may be computed by the controller performing process 2200 based on a locally assigned identifier or an identifier assigned by the master controller, depending on whether the controller is connected to the master. In some embodiments, the state updates distributed to the MFEs include a new version identifier, which may also be assigned from the pool of context identifiers (either the locally-available identifiers or the global identifiers from the master controller, depending on whether the connection between the controllers is up).

VI. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 23:
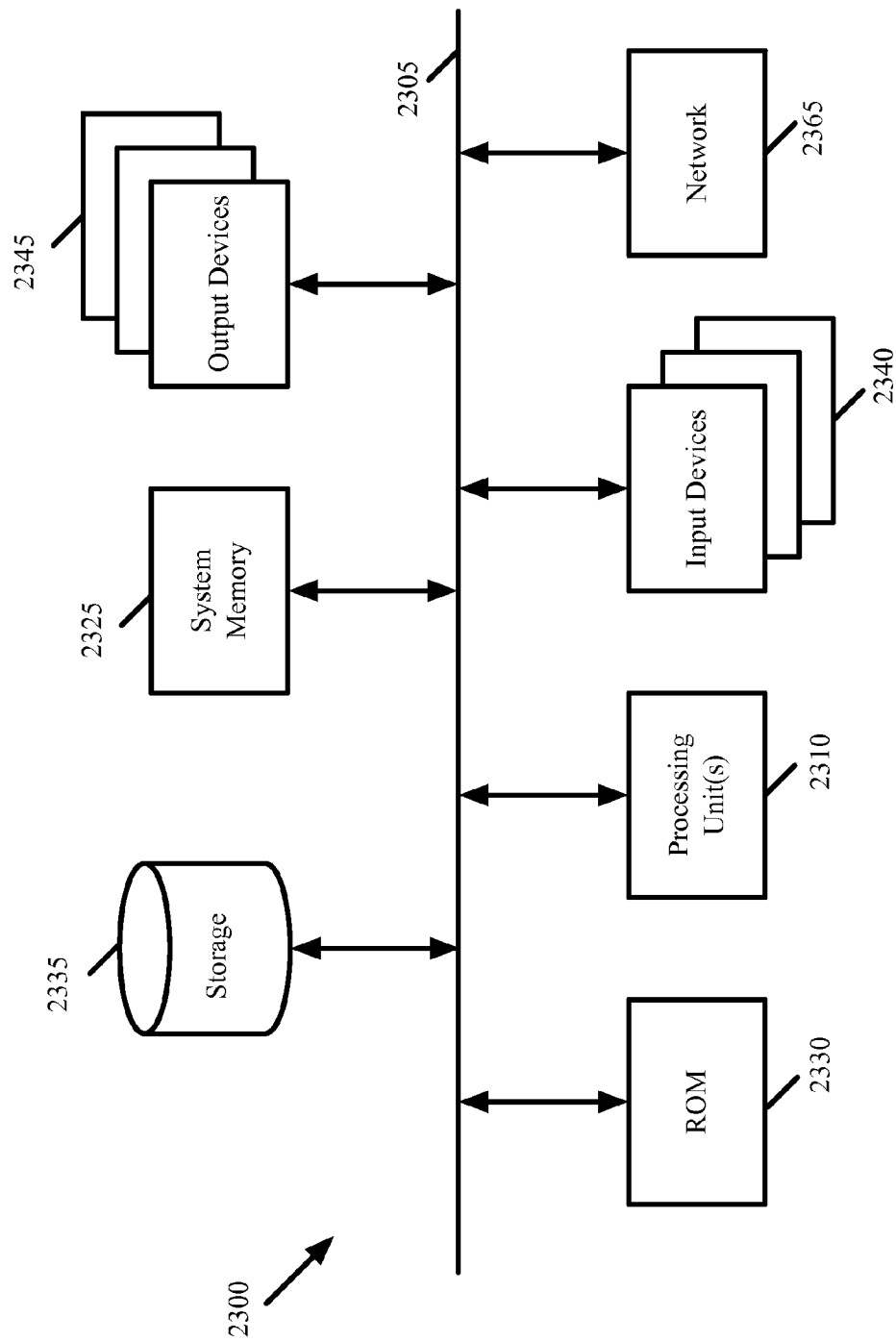
FIG. 23 conceptually illustrates an electronic system with which some embodiments of the invention are implemented.

FIG. 23 conceptually illustrates an electronic system 2300 with which some embodiments of the invention are implemented. The electronic system 2300 can be used to execute any of the control, virtualization, or operating system applications described above. The electronic system 2300 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2300 includes a bus 2305, processing unit(s) 2310, a system memory 2325, a read-only memory 2330, a permanent storage device 2335, input devices 2340, and output devices 2345.

The bus 2305 collectively represents all system, peripheral, and chipset buses that communicatively connect the numerous internal devices of the electronic system 2300. For instance, the bus 2305 communicatively connects the processing unit(s) 2310 with the read-only memory 2330, the system memory 2325, and the permanent storage device 2335.

From these various memory units, the processing unit(s) 2310 retrieve instructions to execute and data to process in order to execute the processes of the invention. The processing unit(s) may be a single processor or a multi-core processor in different embodiments.

The read-only-memory (ROM) 2330 stores static data and instructions that are needed by the processing unit(s) 2310 and other modules of the electronic system. The permanent storage device 2335, on the other hand, is a read-and-write memory device. This device is a non-volatile memory unit that stores instructions and data even when the electronic system 2300 is off. Some embodiments of the invention use a mass-storage device (such as a magnetic or optical disk and its corresponding disk drive) as the permanent storage device 2335.

Other embodiments use a removable storage device (such as a floppy disk, flash drive, etc.) as the permanent storage device. Like the permanent storage device 2335, the system memory 2325 is a read-and-write memory device. However, unlike storage device 2335, the system memory is a volatile read-and-write memory, such a random access memory. The system memory stores some of the instructions and data that the processor needs at runtime. In some embodiments, the invention's processes are stored in the system memory 2325, the permanent storage device 2335, and/or the read-only memory 2330. From these various memory units, the processing unit(s) 2310 retrieve instructions to execute and data to process in order to execute the processes of some embodiments.

The bus 2305 also connects to the input and output devices 2340 and 2345. The input devices enable the user to communicate information and select commands to the electronic system. The input devices 2340 include alphanumeric keyboards and pointing devices (also called "cursor control devices"). The output devices 2345 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 23, bus 2305 also couples electronic system 2300 to a network 2365 through a network adapter (not shown). In this manner, the computer can be a part of a network of computers (such as a local area network ("LAN"), a wide area network ("WAN"), or an Intranet, or a network of networks, such as the Internet. Any or all components of electronic system 2300 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, a number of the figures (including FIGS. 5, 13, 15, 17, 18, and 22) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A network controller for managing a logical network that spans a plurality of physical domains, each physical domain comprising a plurality of forwarding elements managed by network controllers located at the physical domain, the network controller located at a particular one of the plurality of physical domains, the network controller comprising:
    a first storage for storing network state information that is local to the particular physical domain and that does not affect the other physical domains;
    a second storage for storing a first type of global network state information for the logical network, wherein the first type of global network state information affects the other physical domains and is reconcilable between the particular physical domain and the other physical domains after a period of disconnection during which the physical domain is disconnected from the other physical domains;
    a third storage for storing a second type of global network state information for the logical network, wherein the second type of global network state information affects the other physical domains and is non-reconcilable between the particular physical domain and other physical domains after a period of disconnection; and
    an interface for communicating with other network controllers located at the other physical domains in the plurality of physical domains spanned by the logical network, the interface for sharing the first and second types of global network state information,
    wherein the local network state information and first and second types of global network state information comprise data relating to configuration of the logical network.

2. The network controller of claim 1, wherein upon disconnection of the particular domain from at least one of the domains in the plurality of domains spanned by the logical network, (i) the first and second storages are readable and writeable and (ii) the third storage is read-only.

3. The network controller of claim 2, wherein when the particular domain is connected to all of the domains in the plurality of domains spanned by the logical network, the first, second, and third storages are both readable and writeable.

4. The network controller of claim 1, wherein the network controller further comprises a queue for storing updates made to the second storage during the period of disconnection.

5. The network controller of claim 4, wherein the interface is for sharing the updates stored in the queue with the other network controllers located at the other physical domains after the period of disconnection.

6. The network controller of claim 1, wherein the local network state information comprises connectivity information between the network controller and the forwarding elements located in the particular domain that are managed by the network controller.

7. The network controller of claim 1, wherein the first type of global network state information comprises locations of virtual machines that connect to the logical network and are located within the particular physical domain.

8. The network controller of claim 1, wherein the second type of global network state information comprises security policy for the logical network.

9. For a first network controller located at a first domain that manages a logical network spanning a plurality of physical domains including the first domain, a method comprising:
    storing state information for the logical network in at least two storages, the state information comprising network configuration data for the logical network;
    determining that communication is no longer available with a second network controller at a second of the physical domains spanned by the logical network; and
    in response to the determination, modifying a first one of the storages to be read-only while leaving a second one of the storages as writeable while communication with the second network controller is not available, wherein the first storage stores state information that is not reconcilable with the second physical domain after communication with the second network controller is restored.

10. The method of claim 9 further comprising:
    while communication with the second network controller is not available, receiving input to modify the network state information in the first storage; and
    returning an error message indicating that the network state information cannot be modified.

11. The method of claim 9 further comprising:
    while communication with the second network controller is not available, receiving input to modify the network state information in the second storage; and
    modifying the network state information in the second storage based on the input.

12. The method of claim 11 further comprising storing the modification to the network state in a local queue of network state updates.

13. The method of claim 9, wherein the second storage stores network state information that is local to the particular physical domain and the first storage stores global network state information for the logical network.

14. The method of claim 13, wherein the second storage further stores global network state information for the logical network that is reconcilable with the second physical domain after communication with the second network controller is restored.

15. A machine readable medium storing a program for a first network controller located at a first domain that manages a logical network spanning a plurality of physical domains including the first domain, the program comprising sets of instructions for:
    storing state information for the logical network in at least two storages, the state information comprising network configuration data for the logical network;
    determining that communication is no longer available with a second network controller at a second of the physical domains spanned by the logical network; and
    in response to the determination, modifying a first one of the storages to be read-only while leaving a second one of the storages as writeable while communication with the second network controller is not available, wherein the first storage stores state information that is not reconcilable with the second physical domain after communication with the second network controller is restored.

16. The machine readable medium of claim 15, wherein the program further comprises sets of instructions for:
    while communication with the second network controller is not available, receiving input to modify the network state information in the first storage; and
    returning an error message indicating that the network state information cannot be modified.

17. The machine readable medium of claim 15, wherein the program further comprises sets of instructions for:
    while communication with the second network controller is not available, receiving input to modify the network state information in the second storage; and
    modifying the network state information in the second storage based on the input.

18. The machine readable medium of claim 17, wherein the program further comprises a set of instructions for storing the modification to the network state in a local queue of network state updates.

19. The machine readable medium of claim 15, wherein the second storage stores network state information that is local to the particular physical domain and the first storage stores global network state information for the logical network.

20. The machine readable medium of claim 19, wherein the second storage further stores global network state information for the logical network that is reconcilable with the second physical domain after communication with the second network controller is restored.

* * * * *